US012122906B2

(12) United States Patent
Kennedy et al.

(10) Patent No.: US 12,122,906 B2
(45) Date of Patent: Oct. 22, 2024

(54) 3D PRINTABLE THERMOPLASTIC ELASTOMER BLENDS

(71) Applicants: Joseph P. Kennedy, Akron, OH (US); Weinan Xu, Hudson, OH (US)

(72) Inventors: Joseph P. Kennedy, Akron, OH (US); Weinan Xu, Hudson, OH (US)

(73) Assignee: The University of Akron, Akron, OH (US)

( * ) Notice: Subject to any disclaimer, the term of this patent is extended or adjusted under 35 U.S.C. 154(b) by 180 days.

(21) Appl. No.: 17/711,193

(22) Filed: Apr. 1, 2022

(65) Prior Publication Data

US 2022/0315753 A1 Oct. 6, 2022

Related U.S. Application Data

(60) Provisional application No. 63/300,393, filed on Jan. 18, 2022, provisional application No. 63/169,453, filed on Apr. 1, 2021.

(51) Int. Cl.
| | |
|---|---|
| *C08L 53/02* | (2006.01) |
| *B33Y 70/00* | (2020.01) |
| *C08L 71/02* | (2006.01) |
| *C09D 153/02* | (2006.01) |
| *C09D 171/02* | (2006.01) |
| *B29C 64/118* | (2017.01) |
| *B29K 9/06* | (2006.01) |

(52) U.S. Cl.
CPC ............... *C08L 53/02* (2013.01); *B33Y 70/00* (2014.12); *C08L 71/02* (2013.01); *C09D 153/02* (2013.01); *C09D 171/02* (2013.01); *B29C 64/118* (2017.08); *B29K 2009/06* (2013.01)

(58) Field of Classification Search
CPC ......... B33Y 70/00; B33Y 10/00; C08L 53/00; C08L 53/025; C08L 53/02; C08L 71/22; C08L 71/12; C08L 71/02; C08L 25/06; C08L 23/22
See application file for complete search history.

(56) References Cited

U.S. PATENT DOCUMENTS

2018/0071980 A1* 3/2018 Lomasney ............ B29C 64/147

FOREIGN PATENT DOCUMENTS

| CN | 109054275 | * 12/2018 | |
|---|---|---|---|
| EP | 3922672 A1 | * 12/2021 | ............. B33Y 70/00 |

(Continued)

OTHER PUBLICATIONS

Allcock, Contemporary Polymer Chemistry, p. 42-43 (1981).*

(Continued)

*Primary Examiner* — Mark S Kaucher
(74) *Attorney, Agent, or Firm* — Renner, Kenner, Greive, Taylor, Bobak & Weber

(57) ABSTRACT

A 3D-printable blend comprising a thermoplastic elastomer and a polymer. The thermoplastic elastomer is selected from poly(styrene-b-isobutylene-b-styrene) (SIBS), poly(St-b-butadiene-b-St) (SBS), poly(St-b-isoprene-b-St) (SIS), and their hydrogenated derivatives. The polymer is selected from polystyrene (PSt), poly(2,6-dimethyl-1,4-phenylene oxide) (PPO) and blends of PSt and PPO. The blends may be made into filaments suitable for use in the production of 3D printed articles.

8 Claims, 23 Drawing Sheets

(56) References Cited

FOREIGN PATENT DOCUMENTS

JP  2019031654  *  2/2019
WO  WO-2020162366 A1 *  8/2020  ............. B33Y 70/00

OTHER PUBLICATIONS

Xie et al., electronic translation of JP 2019031654, Feb. 2019.*
Ji et al., electronic translation of CN 109054275, Dec. 2018.*
Shen et al. ACS Applied Polymer Materials 2021, 3, 4454-4562 (Year: 2021).*

* cited by examiner

3D PRINTABLE THERMOPLASTIC ELASTOMER BLENDS

CROSS-REFERENCE TO RELATED APPLICATIONS

This application claims the benefit of U.S. Provisional Application No. 63/169,453, filed on Apr. 1, 2021, and U.S. Provisional Application No. 63/300,393, filed on Jan. 18, 2022, both of which are incorporated herein by reference.

FIELD OF THE INVENTION

The present invention relates to the rendering of thermoplastic elastomers for use in 3D printing. More particularly, the present invention relates to the rendering of thermoplastic elastomers such as poly(styrene-b-isobutylene-b-styrene (SIBS) for use in three-dimensional (3D) printing.

BACKGROUND OF THE INVENTION

Fused deposition modeling (FDM) and fused filament fabrication (FFF) are two types of methods for the rapid three-dimensional (3D) printing of prototyping using polymers. They are often used to model prototype designs for medical prostheses, automotive parts, and many other design processes. The most used polymers for FDM and FFF are hard thermoplastics, such as acrylonitrile/butadiene/styrene (ABS) and polylactic acid (PIA).

However, there is a need for other types of polymers for 3D printing beyond conventional thermoplastics. There is a need for soft or elastomeric polymers that can be used to produce polymeric filaments for use with FDM and FFF. The 3D objects fabricated from elastomers have improved flexibility, higher elongation at break, and lower modulus, and could be used for flexible medical implants, and soft matrices for flexible sensors and electronics.

Thermoplastic elastomers (TPEs), which combine the high elasticity of elastomers and melt processability of thermoplastics, are a possible candidate for the use with FDM and FFF 3D printing of soft 3D structures. However, FDM and FFF printing of TPEs is difficult or impossible because of frequent extrusion failures (e.g., improper filament diameter, filament buckling, and annular backflow), poor interlayer adhesion, and insufficient object/bed adhesion. These difficulties are primarily due to the low modulus and hardness of the elastomeric filaments. Commonly used TPE filaments, such as thermoplastic polyurethanes (TPUs), have relatively high hardness (80-95 Shore A) and are not suitable for many applications, such as soft sensors, actuators, and flexible medical implants. Therefore, new FDM and FFF 3D-printable TPEs with widely tunable mechanical properties would be desirable for many applications.

PIB is a synthetic fully saturated elastomer with a unique combination of highly desirable properties, including low permeability, high damping, environmental and chemical stability, and excellent biocompatibility. Once of the most important PIB-based TPEs is the triblock copolymer poly(styrene-b-isobutylene-b-styrene) (SIBS). SIBS is synthesized by the living cationic polymerization of isobutylene and styrene using a bifunctional initiator. It has a unique combination of properties, including exceptionally low permeability, oxidative, hydrolytic, and enzymatic stability, and excellent biostability over its lifespan in the body. SIBS has already been used for biomedical applications, such as drug-eluting coronary stent coating and ophthalmic implants to treat glaucoma.

However, SIBS is incredibly soft (its hardness is in the 25-45 Shore A range), and it exhibits dynamic creep, which negatively affects its dimensional stability. SIBS's creep (due to its relatively modest $T_g$ of about 98° C. of the polystyrene hard segment) limits its ability where shape retention is required. Leading to SIBS being unsuitable for FDM or FFF 3D printing.

Therefore, there is a need in the art to create a blend utilizing TPEs such as SIBS as its major component, which renders the blend useable for FDM or FFF 3D printing.

SUMMARY OF THE INVENTION

An embodiment of the present invention provides a 3D-printable blend comprising a thermoplastic elastomer and a polymer; wherein the thermoplastic elastomer is selected from the group consisting of poly(styrene-b-isobutylene-b-styrene) (SIBS), poly(St-b-butadiene-b-St) (SBS), poly(St-b-isoprene-b-St) (SIS), and their hydrogenated derivatives and wherein the polymer is selected from the group consisting of polystyrene (PSt), poly(2,6-dimethyl-1,4-phenylene oxide) (PPO) and blends thereof.

Another embodiment of the present invention provides a 3D-printable blend as in any embodiment above, wherein Shore A hardness, shear viscosity, thermal stability, storage modulus, and loss modulus of the blend are all increased as compared to a composition that contains one of the thermoplastic elastomers selected from the group consisting of SIBS, SBS, SIS, and their hydrogenated derivatives.

Another embodiment of the present invention provides a 3D-printable blend as in any embodiment above, wherein the polymer is PSt and wherein the 3D-printable blend contains between 20 and 50 wt. % of PSt.

Another embodiment of the present invention provides a 3D-printable blend as in any embodiment above, wherein the PSt has a molecular weight of between 1,200 and 192,000 g/mol.

Another embodiment of the present invention provides a 3D-printable blend as in any embodiment above, wherein the polymer is PPO and wherein the 3D-printable blend contains between 30 and 60 wt. % of PPO.

Another embodiment of the present invention provides a 3D-printable blend as in any embodiment above, wherein the PPO has a molecular weight of between 19,000 and 50,000 g/mol.

It will be appreciated that the blends may be extruded or otherwise formed into filaments for use as 3D printable material. Thus, one embodiment of the present invention provides filaments extruded or otherwise made from the blends of the present invention.

Another aspect of the present invention provides for a 3D-printed article made from a blend comprising a thermoplastic elastomer and a polymer; wherein the thermoplastic elastomer is selected from the group consisting of poly(styrene-b-isobutylene-b-styrene) (SIBS), poly(St-b-butadiene-b-St) (SBS), poly(St-b-isoprene-b-St) (SIS), and their hydrogenated derivatives and wherein the polymer is selected from the group consisting of polystyrene (PSt), poly(2,6-dimethyl-1,4-phenylene oxide) (PPO) and blends thereof.

Another embodiment of the present invention includes a 3D-printed article, as above, produced by fused deposition modeling three-dimensional printing or by fused filament fabrication three-dimensional printing.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

Figure 1A:
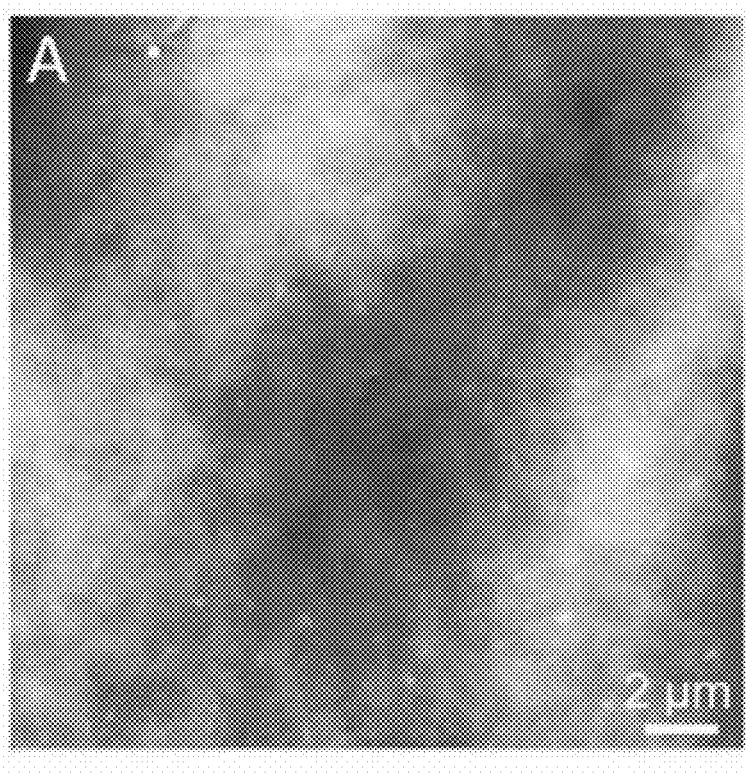
FIG. 1A is an atomic-force microscopy (AFM) height image of pure SIBS.

The present invention relates to blends of TPE's with a second polymer such that the blend is then useable for 3D printing. In the present invention, the TPE is selected from the group consisting of poly(styrene-b-isobutylene-b-styrene) (SIBS), poly(St-b-butadiene-b-St) (SBS), poly(St-b-isoprene-b-St) (SIS), and their hydrogenated derivatives It will be appreciated that it is an important aspect of the present invention that SIBS, SBS, and SIS on their own, are not useable for 3D printing. While the bulk of the application will refer to the blend containing SIBS, any mention of SIBS also entails the use of SBS, SIS, or their hydrogenated derivatives in the place of SIBS.

Blends of the present invention have a superior modulus and harness as compared to SIBS on its own, which renders the blends of the present invention to be useable for 3D printing and leads to improved mechanical and thermal properties. It has also been discovered that the amount and molecular weight of the second polymer used for blending with the SIBS strongly affects the morphology of the blends, and which, at well-defined compositions, surprisingly exhibit a "salami" pattern that is characteristic of excellent 3D printability and signals the improved mechanical and thermal properties found in the blends of the present invention.

In one or more embodiments of the present invention, the second polymer is selected from the group consisting of polystyrene (PSt), poly(2,6-dimethyl-1,4-phenylene oxide) (PPO) and blends of the two. In one or more other embodiments, it will be appreciated that the second polymer can be any homopolymer that has the same chemical structure as the hard block in the thermoplastic elastomers used in the blend. In SIBS and SIS, the hard block is styrene, and thus, the homopolymer is polystyrene. It has been surprisingly found that the addition of homopolymer improves the hardness and modulus of such thermoplastic elastomers.

In one or more embodiments, the second polymer may be polystyrene (PSt). SIBS, having an average molecular weight of 65,000 g/mol, was blended with PSt with different molecular weights ranging from 1,200 to 192,000 g/mol. The weight percent of total PSt in the blends was varied from 20% to 50% and it was discovered that the inclusion of PSt increased the hardness (Shore A) of just SIBS alone of 43.7 up to 73.5 for a blend of SIBS/PSt, depending on the weight percent of the PSt.

SIBS/PSt blends with high MW PSt (192,000 g/mol) changed the morphology of the blend from scattered PSt domains in a SIBS matrix at 23 wt. % PSt, to a hierarchical salami morphology at 43 wt. % PSt. Desirably for 3D printing, the salami morphology of SIBS/PSt blends obtained when using a high PSt weight fraction leads to decreased shear viscosity of the melt, relative to SIBS/PSt blends using a lower PSt weight fraction. It was also discovered that SIBS/PSt blends have a higher thermal stability than pure SIBS. The maximum weight loss rate temperature increased by more than 10° C.

As stated above, SIBS on its own is not 3D printable, but the SIBS/PSt blends of the present invention were found to have exhibit excellent 3D printability compared with pure SIBS, and the printability was able to be tuned by the amount of PSt present in the blend (see Table 1). The mechanical properties of the 3D printed SIBS/PSt blends depend on the weight fraction of the PSt. The tensile strength and modulus increased with the amounts of PSt used, and elongation at break decreases with increasing PSt. It was also found that blends with higher MW PSt have better printability than lower MW PSt at the same weight fraction.

TABLE 1

SIBS/PSt blend compositions and properties

| Sample | PSt (wt. %) | Shore A Hardness | Shear Viscosity Pa · s (at a 10 s$^{-1}$ rate) | Printability* |
|---|---|---|---|---|
| SIBS | 0 | 43.7 | 563 | No |
| SIBS/PSt | 23 | 50.5 | 1255 | Unsuitable |
| SIBS/PSt | 33 | 58.3 | 1270 | Good |
| SIBS/PSt | 43 | 73.5 | 1040 | Excellent |

*Printability defined as successfully printing a 3D object with at least 5 mm of height or 300 layers without extrusion failure or visible defects.

In another embodiment, the second polymer is PPO. SIBS, having an average molecular weight of 65,000 g/mol, was blended with PPO with different molecular weights ranging from 19,000 to 50,000 g/mol. The weight percent of total PPO in the blends was varied from 30% to 60% and it was discovered that the inclusion of PPO increased the hardness (Shore A) of just SIBS alone of 43.7 up to 85.0 for a blend of SIBS/PPO, depending on the weight percent of the PPO.

The addition of PPO to SIBS produced substantial morphological changes. Large-are scans of SIBS/PPO (70/30) showed high surface roughness with large height variation. There were small spherical PPO-rich domains with heights of about 500 nm. In contrast, SIBS/PPO (60/40) and SIBS/PPO (50/50) showed relatively smooth surfaces. With increasing PPO content, the SIBS/PPO (30/70) showed rough surfaces with high-density spherical core-shell domains of about 7000 nm in a continuous matrix. High-resolution atomic-force microscopy (AFM) images were taken which showed that SIBS/PPO blends with PPO takin up between 30% and 50% of the blend, exhibited a two-phase co-continuous structure parallel to the substrate, which was in contrast to the vertical cylindrical structure of just SIBS on its own. When the PPO becomes the major component in the blend, the AFM images no longer showed a well-defined microphase separated morphology, but instead exhibited small spherical domains with phase-separated morphology within a homogenous PPO matrix.

As stated above, SIBS on its own is not 3D printable, but the SIBS/PPO blends of the present invention were found to have exhibit excellent 3D printability compared with pure SIBS, and the printability was able to be tuned by the amount of PPO present in the blend (see Table 2). The mechanical properties of the 3D printed SIBS/PPO blends depend on the weight fraction of the PSt. The tensile strength and modulus increased with the amounts of PPO used, and elongation at break decreases with increasing PPO.

TABLE 2

SIBS/PPO blend compositions and properties

| Sample | PPO (wt. %) | Shore A Hardness | Shear Viscosity Pa · s (at a 20 s$^{-1}$ rate) | Printability* |
|---|---|---|---|---|
| SIBS | 0 | 43.7 | 435 | No |
| SIBS/PPO | 30 | 68 | 1326 | Acceptable |
| SIBS/PPO | 40 | 78 | 1804 | Good |
| SIBS/PPO | 50 | 85 | 2652 | Acceptable |
| SIBS/PPO | 60 | 92 | N/A** | No |

*Printability defined as successfully printing a 3D object with at least 5 mm of height or 300 layers without extrusion failure or visible defects.
**The shear viscosity of this sample was not measurable due to its high viscosity that blocked the capillary.

The molecular weight of the PPO was found to affect the morphology and physical properties of the SIBS/PPO blends. Relatively low molecular weight PPO was expected to be completely miscible with SIBS. The morphological changes of the SIBS/PPO blends using a PPO with a molecular weight of 19,000 g/mol when the PPO content increased were consistent with the SIBS/PPO blends using a PPO with a molecular weight of 50.000 g/mol when the PPO content increased. However, the 3D printability of the two different blends were not consistent, with the SIBS/PPO blends using a PPO with a molecular weight of 50,000 g/mol only being printable with a 30% to 50% r PPO content, and the SIBS/PPO blends using a PPO with a molecular weight of 19,000 g/mol only being printable with a 30% to 40% PPO content.

The mechanical properties of the blends were also affected by the molecular weight of the PPO, with Table 3 below summarizing the results. The SIBS/PPO blend that was 70/30 with a PPO having a molecular weight of 19,000 g/mol showed a higher modulus and a lower elongation at break than that of the SIBS/PPO blend that was 70/30 with a PPO having a molecular weight of 50,000 g/mol. Similarly, the SIBS/PPO blend that was 60/40 with a PPO having a molecular weight of 19,000 g/mol showed a higher modulus and a lower elongation at break than that of the SIBS/PPO blend that was 60/40 with a PPO having a molecular weight of 50,000 g/mol.

In another embodiment, the second polymer is a blend of PSt and PPO. Noryl® is a blend of PST and PPO with a strong combination of mechanical and thermal properties. SIBS/Noryl® blends containing 40 wt. % Noryl® were able to be extruded into thin filaments that were able to be used to FFF 3D printing.

It will further be appreciated that the 3D printability of thermoplastic elastomers can be enhanced, not only with the addition of a second polymer such as a homopolymer having the same chemical structure as the hard block in the thermoplastic elastomer, but can also be enhanced or improved when the blends are extruded into filaments. When provided as filaments, the mole fraction of the PSt in the SIBS copolymer may be between 20% and 50%. The filaments may have a diameter between 0.5 mm and 4 mm. The hardness of the filament materials may be between 45 and 95 (Shore A).

EXAMPLES

Experiment I—SIBS/PSt

Blending of Polymers and Fabrication of Filaments

The SIBS block copolymer was provided by Kaneka C. (MW—65,000 g/mol having 30 wt. % PSt blocks). The PSt homopolymer with a molecular weight of 192,000 g/mol was obtained from Sigma-Aldrich and the PSt homopolymers having a molecular weight of 45,000 g/mol and 1,200 g/mol were obtained from Scientific Polymer Products, Inc.

The SIBS and PSt were blended in various mass ratios, with SIBS being the major component (see TABLE 1 above); and wherein the lowest PSt wt. % was 23%, and the highest PSt wt. % was 43%. Blending was done in solution by dissolving both SIBS and PSt in toluene at a predetermined weight ratio. The solvent was evaporated to get solid SIBS/PSt blends, which were cut into small pieces and used as the feedstock for filament fabrication. Filament production was conducted using a Wellzoom B2 Desktop Filament extruder wherein the extrusion temperature was 180° C., and the diameter of the extrusion nozzle was 1.75 mm.

Morphological Studies

Figure 1B:
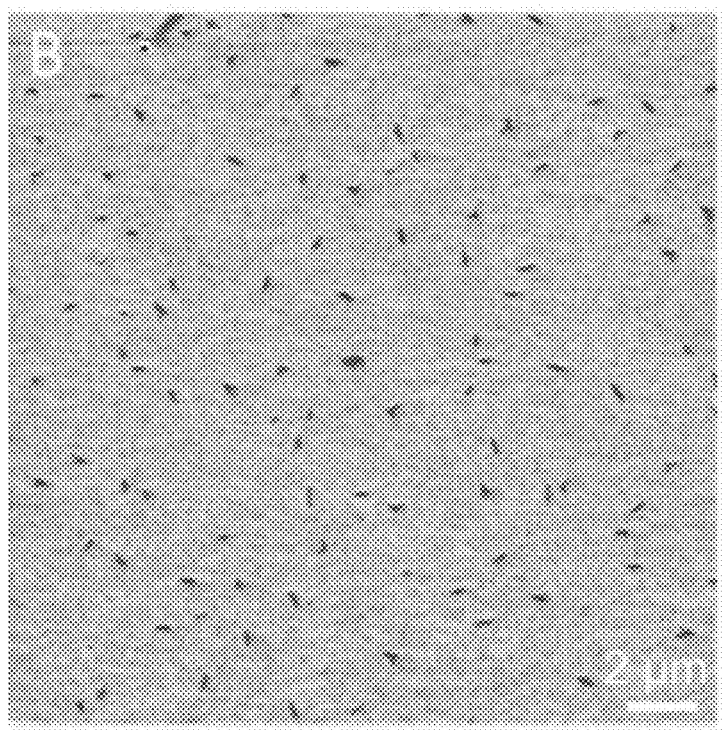
FIG. 1B is an AFM phase image of pure SIBS.
Figure 1C:
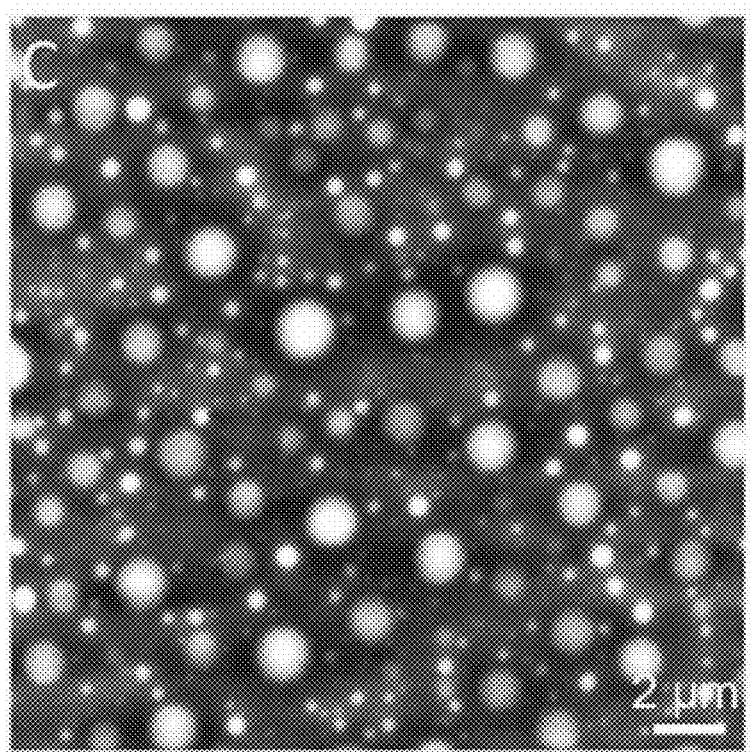
FIG. 1C is an AFM height image of a blend of SIBS/PSt (77/23 wt. %) of the present invention.
Figure 1D:
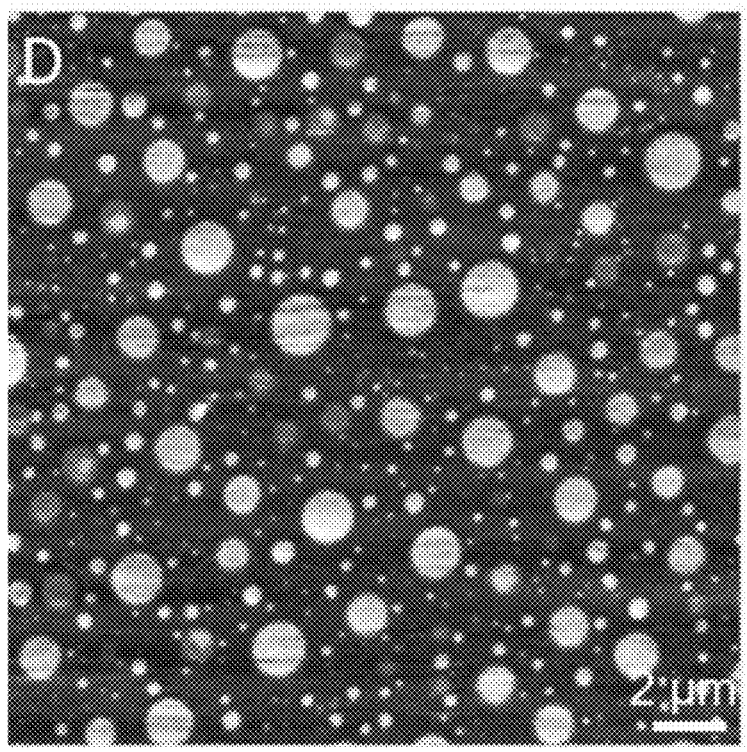
FIG. 1D is an AFM phase image of a blend of SIBS/PSt (77/23 wt. %) of the present invention.
Figure 2A:
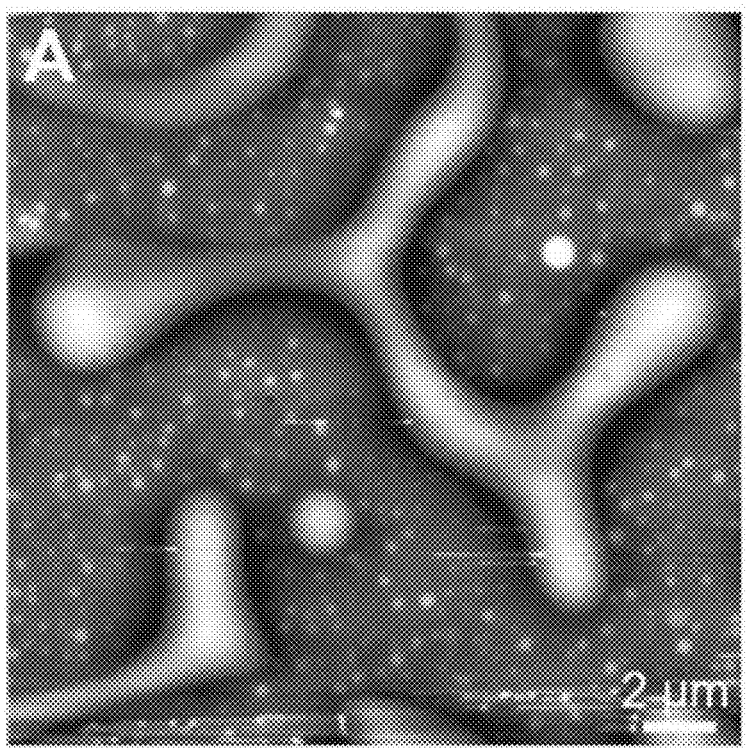
FIG. 2A is an AFM height image of a blend of SIBS/PSt (67/33 wt. %) of the present invention.
Figure 2B:
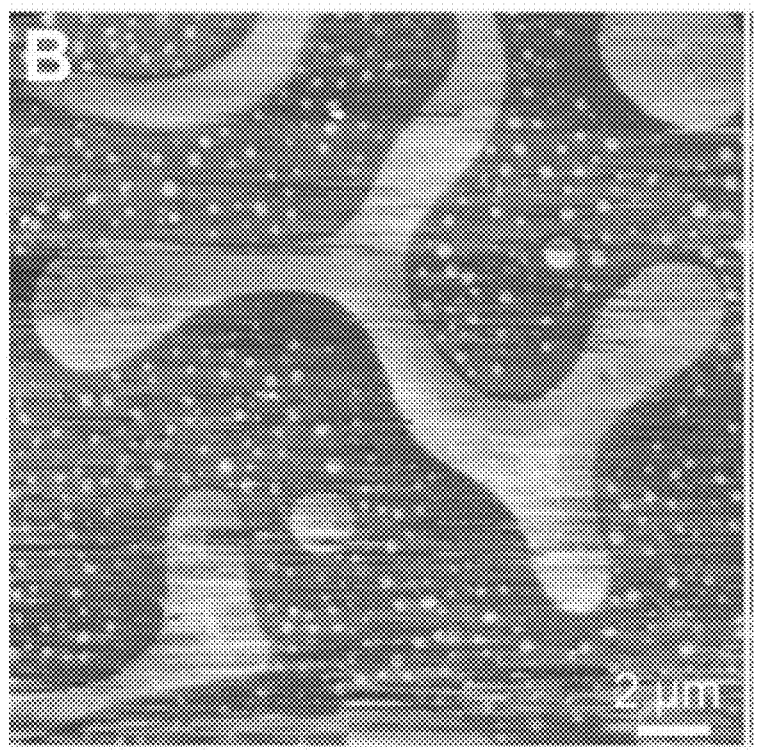
FIG. 2B is an AFM phase image of a blend of SIBS/PSt (67/33 wt. %) of the present invention.

Pure SIBS exhibited overall uniform morphology with a typical hexagonal packed cylindrical microphase separated structure between the PSt and PIB blocks at the nanometer scale as shown in FIGS. 1A and 1B. Upon addition of the PSt homopolymer, the SIBS/PSt (77/23 wt. %) blend showed a high density of small spherical PSt domains with sizes ranging from 0.2-1.5 µm in the SIBS matrix as shown in FIGS. 1C and 1D. By increasing the PSt content, the morphology of the SIBS/PSt blend changes significantly. When the PSt weight fraction is increased to 33%, the larger spherical PSt domains start to coalesce with each other and form a semi-continuous branched morphology as shown in FIGS. 2A and 2B, while the smaller spherical PSt domains (<500 nm) remained dispersed in the SIBS matrix.

Figure 2C:
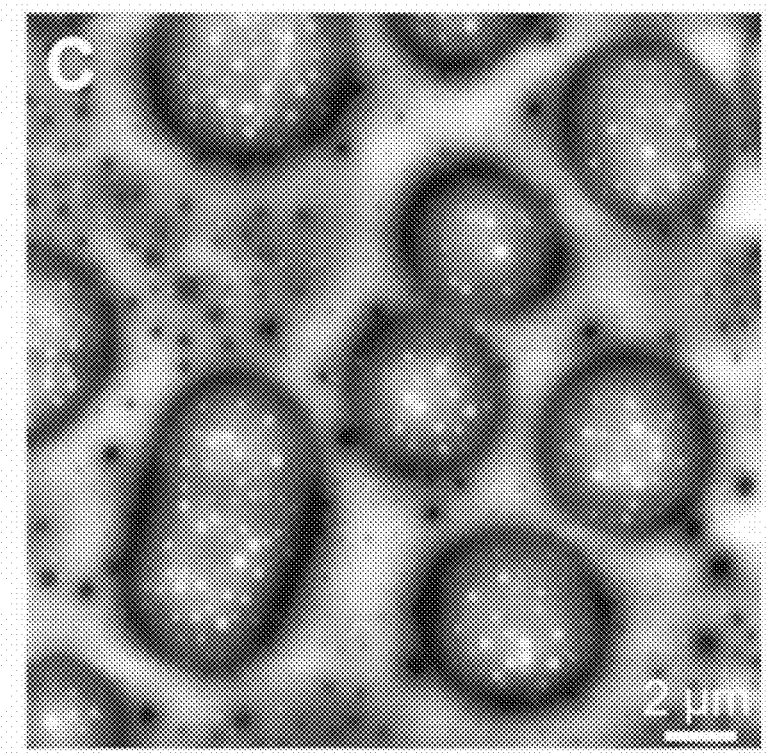
FIG. 2C is an AFM height image of a blend of SIBS/PSt (57/43 wt. %) of the present invention.
Figure 2D:
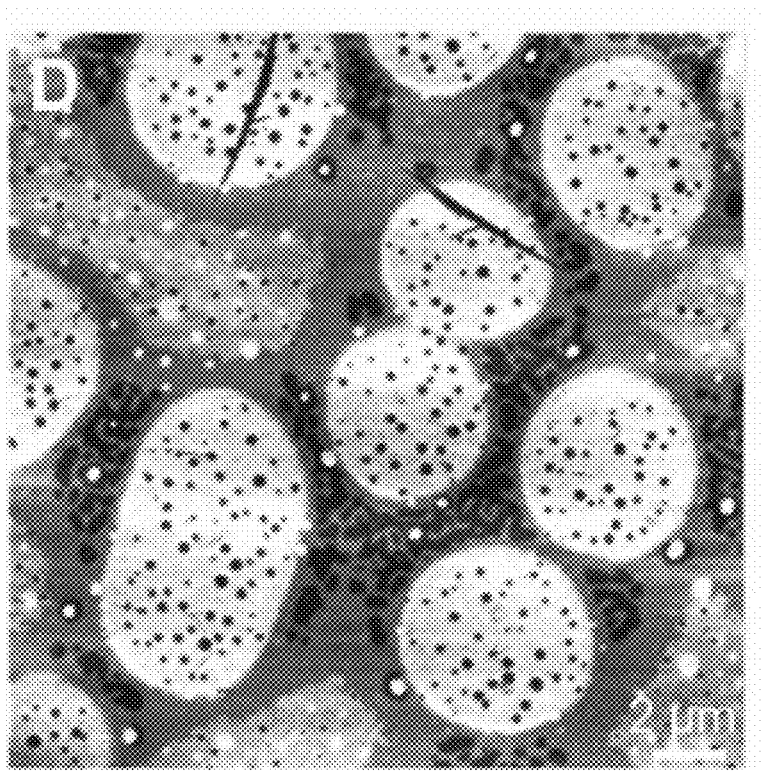
FIG. 2D is an AFM phase image of a blend of SIBS/PSt (57/43 wt. %) of the present invention.

By increasing the PSt weight fraction to 43%, unexpectedly, a unique hierarchical "salami" phase appeared as shown in FIGS. 2C and 2D. This morphology is characterized by large spherical or near-spherical PSt domains (sizes ranging from 3 to 10 µm) filled with smaller SIBS subdomains (average size: 200 nm). This hierarchical salami morphology is unique and signals excellent printability and other desirable changes in properties, as will be discussed.

Hardness Testing

The hardness of a polymer is a defining criterion for its applicability in 3D printing. The hardness of the SIBS and SIBS/PSt blends was determined with a Shore A Digital hardness tester (Gain Express Holdings Ltd) according to ISO 868-1986). The samples for hardness tests were prepared by compression molding. Pure SIBS had a hardness of 43.7 (Shore A), which is too soft for 3D printing with conventional FDM printers. Blending SIBS with PSt increases the hardness. A shore A harness of 55 or higher is required for successful printing of SIBS/PSt blends. The hardness values for PIB/PSt blends with 23 wt. %, 33 wt. % and 43 wt. % PSt, were 50.5, 58.3, and 73.5, respectively.

Rheological Characterization

Figure 3:
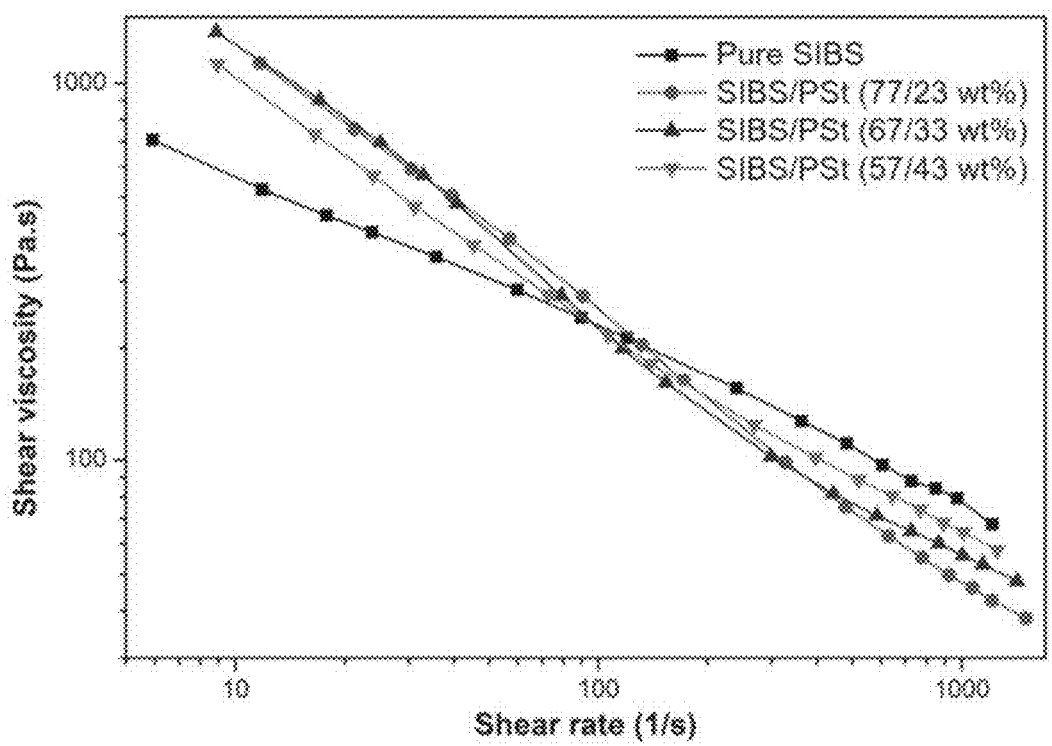
FIG. 3 is a graph of shear viscosity as a function of shear rate for pure SIBS and blends of the present invention.

The melt viscosity (or flowability) of a polymer is another important parameter for FDM 3D printing. Melt viscosity is usually expressed by the melt flow index or shear viscosity. A relatively low shear viscosity is beneficial for FDM 3D printing because the melt can be extruded more easily. The rheological properties of SIBS and SIBS/PSt blends in the melt were studied using a capillary rheometer (Rosand RH 7). The shear viscosity of SIBS and SIBS/PSt blends was determined as a function of shear rate as shown in the graph of FIG. 3, with pure SIBS and every SIBS/PSt blends of the present invention showing shear thinning.

The shear viscosity of SIBS and the SIBS/PSt blends at a shear rate of 10 s$^{-1}$ (which is close to the condition when the polymer filament is extruded from the nozzle during FDM 3D printing) were measured and compared. Pure SIBS had a shear viscosity of 563 Pa-s (at 10 s$^{-1}$ shear rate). This increased to 1255, and 1270 Pa-s for the SIBS/PSt blends with 23 and 33 wt. % PSt, respectively. The shear viscosity did not increase monotonically with the added amount of PSt: the SIBS/PSt (57/43%) blend exhibited a lower viscosity of 1040 Pa-s. This behavior is unexpected and is related to the salami morphology observed only for the SIBS/PSt (57/43%) blend.

Thermal Stability Testing

Figure 4:
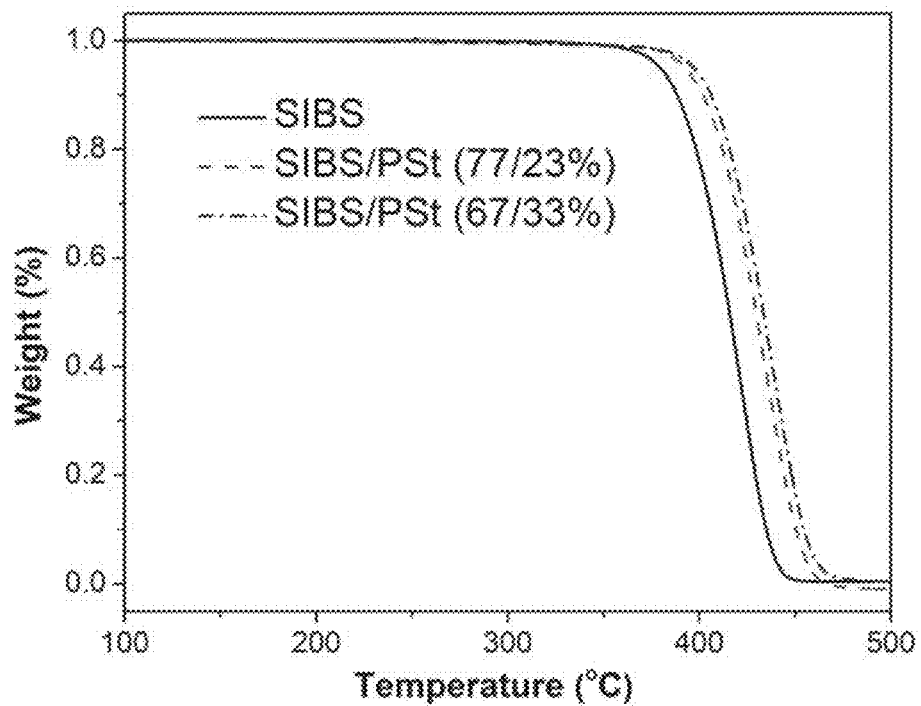
FIG. 4 is a graph of thermogravimetric analysis (TGA) curves of pure SIBS and blends of the present invention.

The thermal stability of pure SIBS and the SIBS/PSt blends of the present invention were studied by thermogravimetric analysis (TGA) (TA Instruments Q500). Compared with pure SIBS, the SIBS/PSt blends of the present invention have increased thermal stability as show in the graph of FIG. 4. The 5 wt. % weight loss temperature has increased from 379° C. for pure SIBS to 397° C. for a SIBS/PSt blend (67/33%), and the maximum weight loss rate temperature increased from 422° C. to 438° C.

Dynamic Mechanical Analysis

Figure 5A:
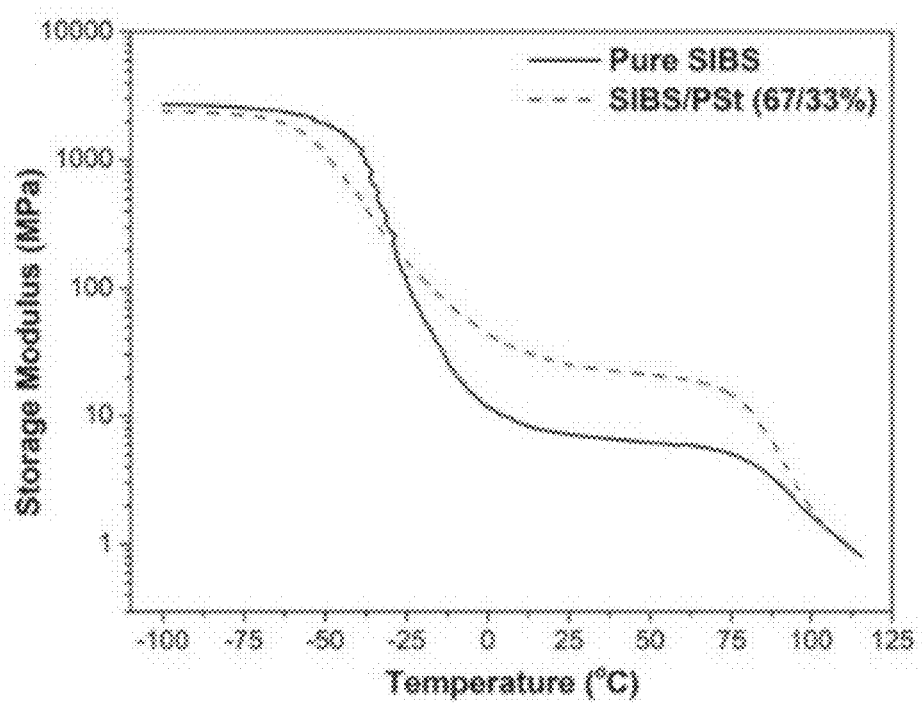
FIG. 5A is a graph of storage modulus versus temperature between pure SIBS and a blend of SIBS/PSt (67/33 wt. %) of the present invention.
Figure 5B:
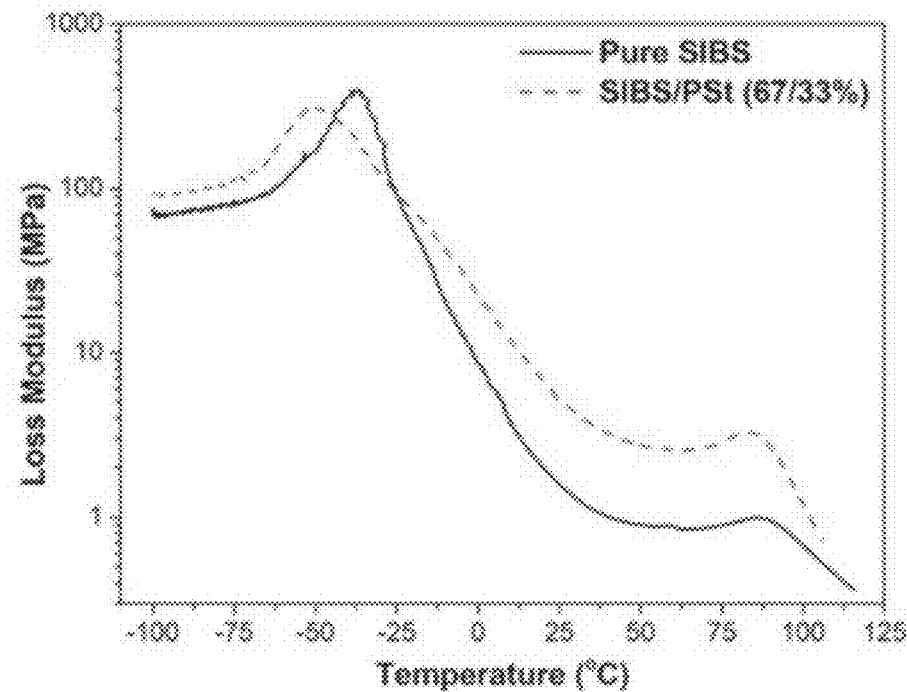
FIG. 5B is a graph of loss modulus versus temperature between pure SIBS and a blend of SIBS/PSt (67/33 wt. %) of the present invention.
Figure 5C:
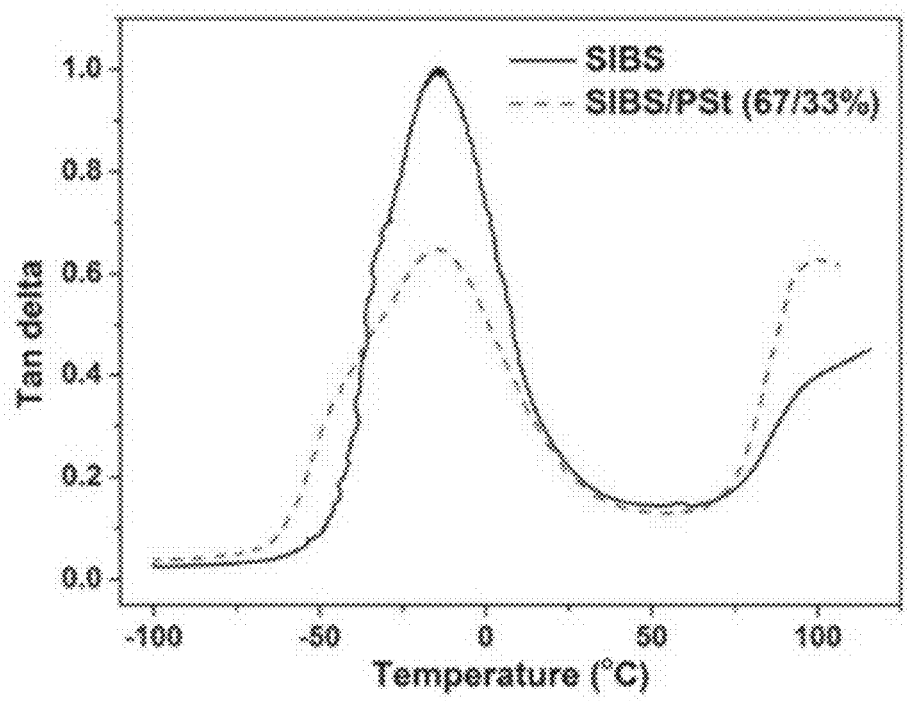
FIG. 5C is a graph of tan delta versus temperature between pure SIBS and a blend of SIBS/PSt (67/33 wt. %) of the present invention.

Dynamic Mechanical Analysis (DMA) was used to characterize the viscoelastic behavior of pure SIBS and the SIBS/PSt blends of the present invention as shown in FIGS. 5A, 5B, and 5C. SIBS has two main transitions, a high temperature transition, corresponding to the glass transition (Tg) of the PSt block at about 105° C. The low temperature transition consists of a shoulder peak at −40° C., which corresponds to the PIB block, and a main peak at −15° C., which is likely due to a sub-Rouse type motion caused by relaxation occurring at longer time scales. Pure SIBS and the SIBS/PSt blends of the present invention exhibit similar thermal transitions. The main difference is that the SIBS/PSt blends have higher storage modulus and loss modulus than pure SIBS in the −20° C. to 100° C. range. The improved mechanical property of the SIBS/PSt blends of the present invention is important for their successful use in FDM 3D printing.

Use of Composition in 3D Printing

Filaments of the SIBS/PSt blends of the present invention were used for FDM 3D printing using a commercial 3D printer (Wanhao Duplicator i3) equipped with a modified printing head (Flexion Extruder). The nozzle diameter was 0.8 mm, the printing temperature was 230° C., the build plate temperature was 80° C., and the printing speed was varied from 2 to 20 mm/s. The printing head moved in the X, Y, and Z directions controlled by the software. The 3D models were built using Solidworks software. The printability of SIBS and SIBS/PSt blends was summarized above in Table 1. Printability was defined by the successful printing of a 3D structure with at least 5 mm in height or 300 printing layers without extrusion failure or large defects.

Pure SIBS could not be successfully printed. Unsuitable printing (i.e., as with SIBS/PSt 77/23%) indicated that printing could be completed, but with noticeable defects and high surface roughness. Good printability (i.e., as with SIBS/PSt 67/33%) indicated that the structure had a smooth surface and no visible defects. Excellent printability (i.e., as with SIBS/PSt 57/43%) indicated uniformity and smooth objects with high shape fidelity.

Tensile Testing

Figure 6:
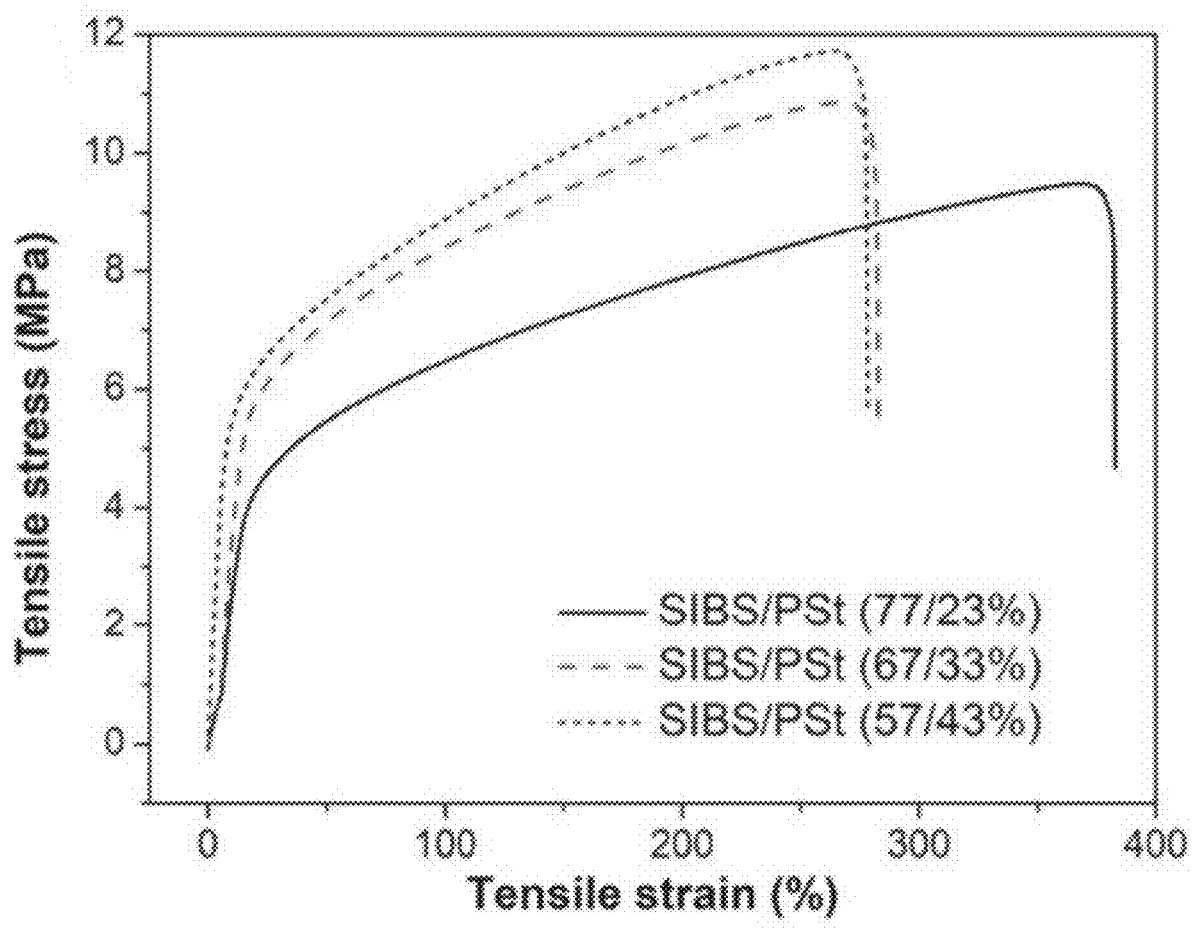
FIG. 6 is a graph of stress strain curves of blends of the present invention.

The filaments made from the SIBS/PSt blends of the present invention were 3D printed into dog-bone shaped samples for tensile tests according to ISO-37 (type 3) standard. The tests were conducted with Instron 4204 Tensile Tester. The SIBS/PSt (77/23%) sample had a tensile strength of 9.0 MPa, a modulus of 31.7 MPa and an elongation at break of 380% as shown in the graph of FIG. 6. The SIBS/PSt (67/33%) sample showed a tensile strength of 10.2 MPa, a modulus of 48.3 MPa and an elongation at break of 280%. The SIBS/PSt (57/43%) sample had a tensile strength of 11.1 MPa, a modulus of 85.2 MPa and an elongation at break of 276%. In sum, with increasing PSt content, the tensile strength and modulus increased, while the elongation at break decreased.

Figure 7:
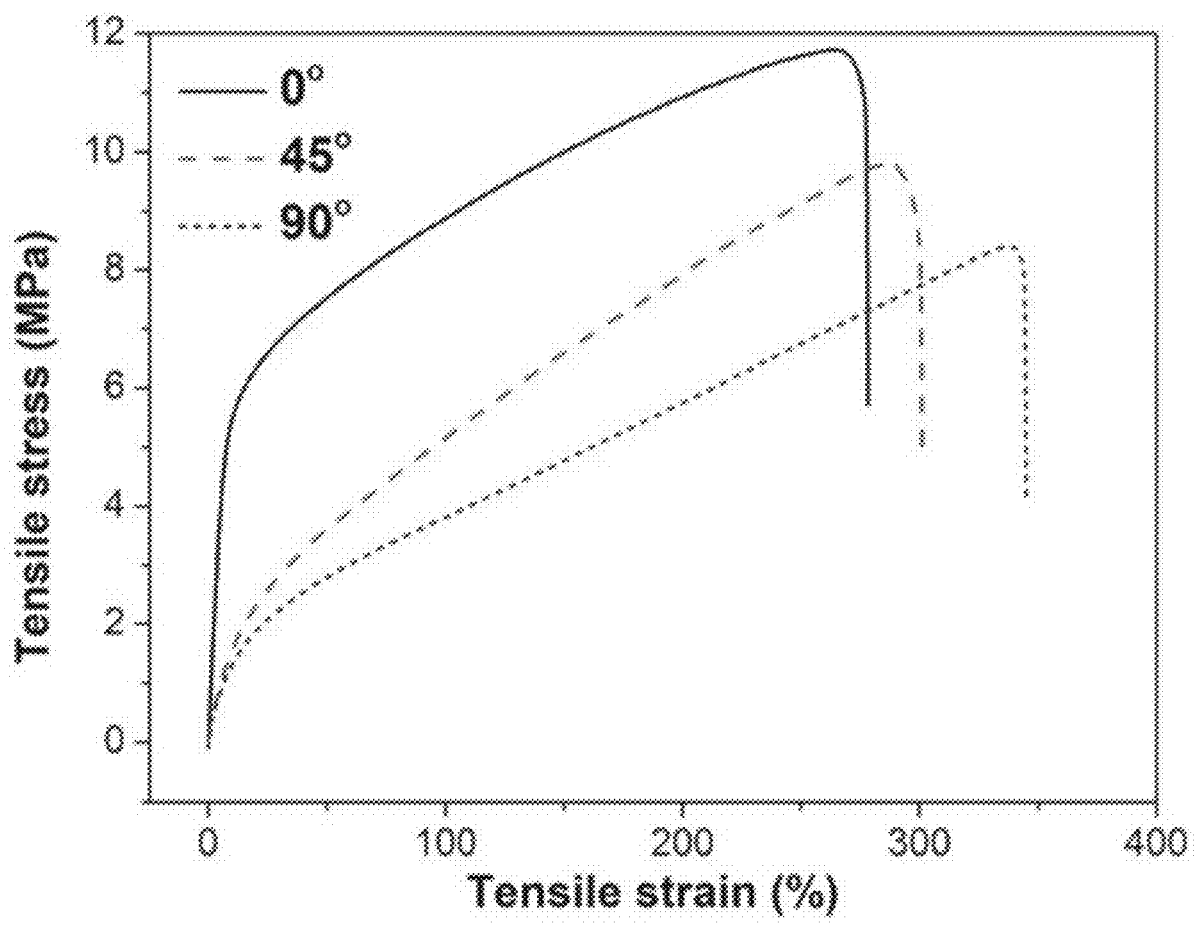
FIG. 7 is a graph of stress strain curves of blends of the present invention at different printing directions.

The printing direction during 3D fabrication also had a strong effect on the mechanical properties of the printed objects. The SIBS/PSt (57/43%) blend was printed into three types of dog-bone shaped samples at a 0°, 450, and 90° printing directions, with respect to the long axis of the dog-bone shaped samples. The 0° printing direction sample had the highest tensile strength of 11.1 MPa and the lowest elongation at break of 276%, as shown in the graph of FIG. 7. The 45° printing direction sample had a tensile strength of 9.0 MPa and an elongation at break of 298% while the 90° printing direction sample had the lowest tensile strength of 8.11 MPa and the highest elongation at break of 344%. The dependence of mechanical properties on printing angle is a common feature of FDM 3D printing. The main reason is that there are two different failure modes for 3D printed samples during tensile testing: interlayer failure mode and in-layer failure mode. An inter-layer failure mode occurs when fracture takes place at the interface between two adjacent material layers and the material layers remain intact after failure, i.e., failure requires less force. An in-layer failure occurs when material layers break. In-layer failure tends to occur when the printing angle is small (such as 0°), whereas inter-layer failure tends to occur when the printing angle is large (such as 90°).

Testing the Effect of the Molecular Weight of the PSt

Figure 8A:
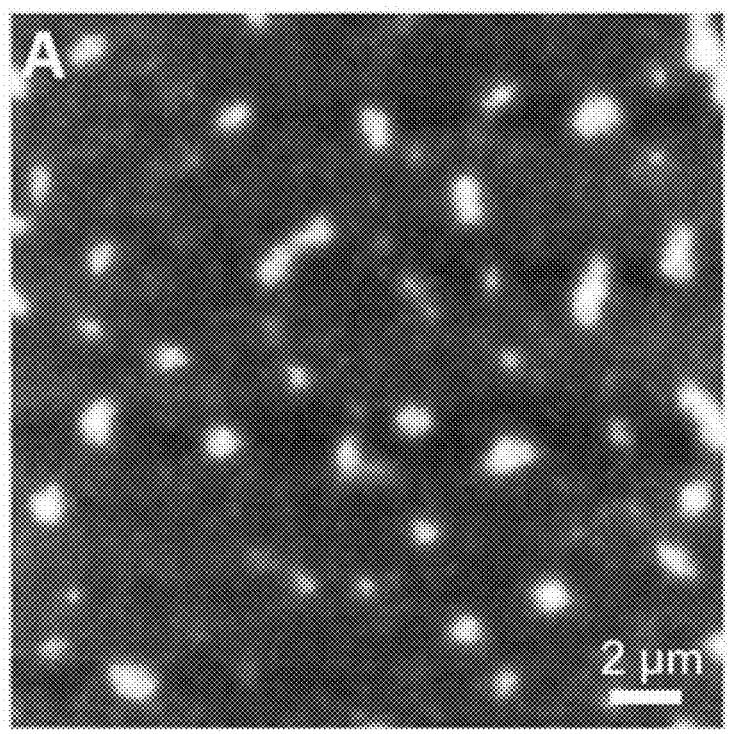
FIG. 8A is an AFM height image of a SIBS/PSt (77/23 wt. %) blend of the present invention utilizing a PSt with a molecular weight of 1,200 g/mol.
Figure 8B:
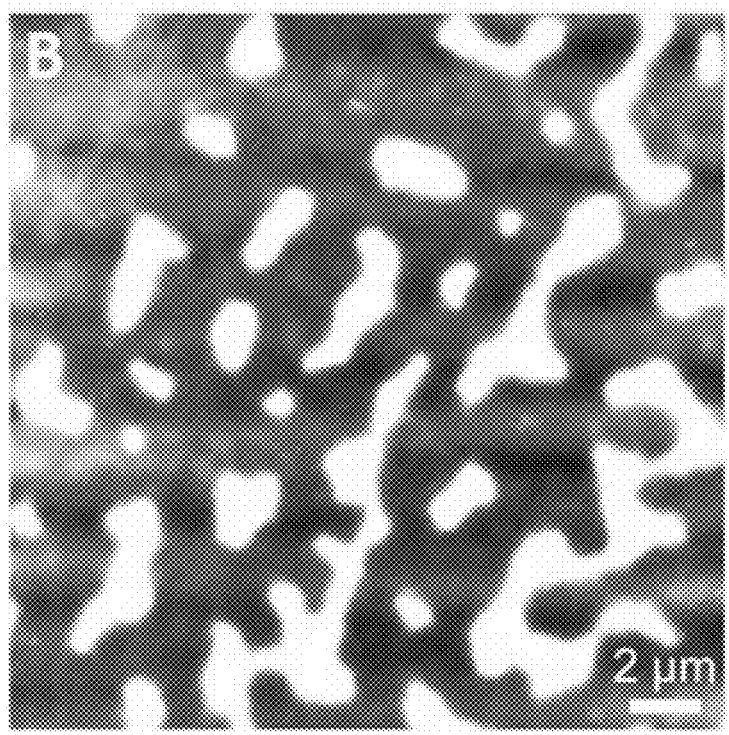
FIG. 8B is an AFM height image of a SIBS/PSt (67/33 wt. %) blend of the present invention utilizing a PSt with a molecular weight of 1,200 g/mol.
Figure 8C:
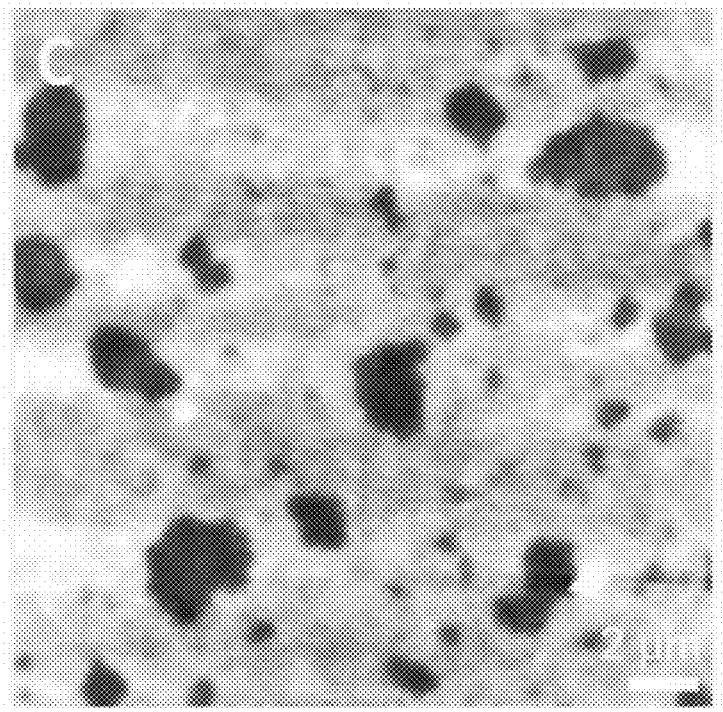
FIG. 8C is an AFM height image of a SIBS/PSt (57/43 wt. %) blend of the present invention utilizing a PSt with a molecular weight of 1,200 g/mol.

The molecular weight of PSt was found to significantly affect the molecular architecture, printability, and mechanical properties of the SIBS/PSt blends of the present invention. AFM experiments were conducted on SIBS/PSt blends with PSt MW of 45,000 and 1,200 g/mol. Blends having 23 wt. % PSt with a molecular weight of 1,200 g/mol formed 0.3-2 μm irregular shaped aggregates in the SIBS matrix (FIG. 8A). The size of the PSt domains increased with increasing PSt content to 33 wt. % (FIG. 8B). At 43 wt. % PSt, the SIBS/PSt blend exhibited an inverse surface morphology with the PSt becoming the continuous phase and SIBS the scattered domains (FIG. 8C).

Figure 9A:
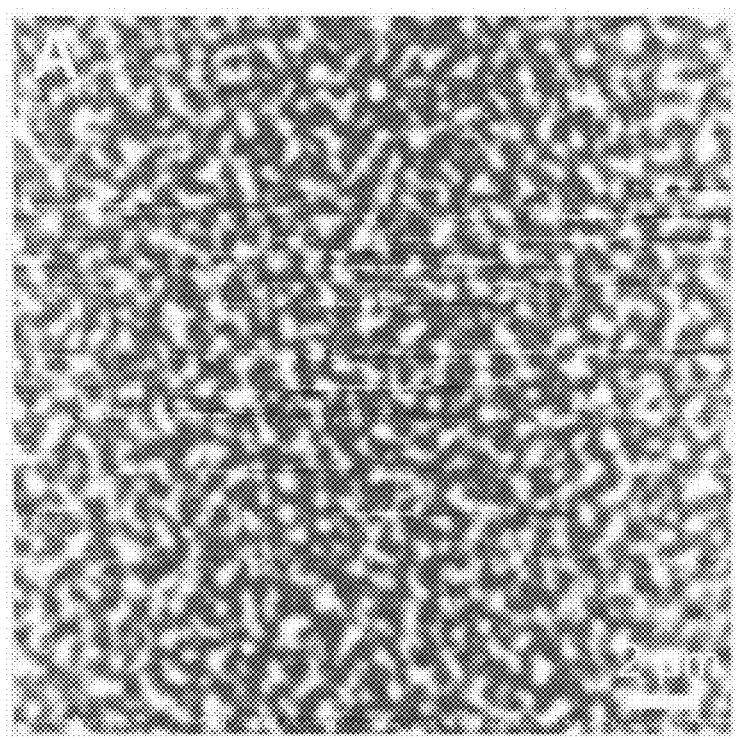
FIG. 9A is an AFM height image of a SIBS/PSt (77/23 wt. %) blend of the present invention utilizing a PSt with a molecular weight of 45,000 g/mol.
Figure 9B:
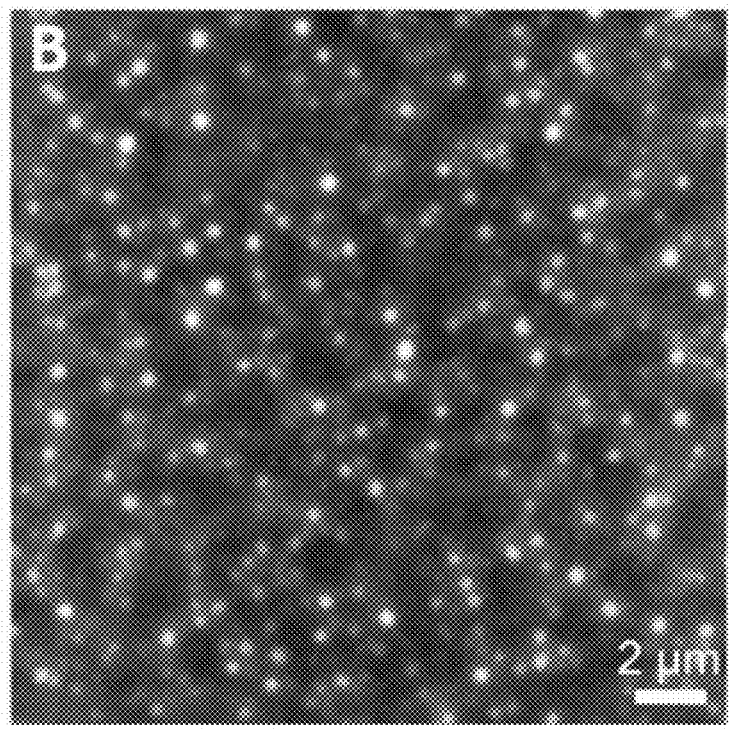
FIG. 9B is an AFM height image of a SIBS/PSt (67/33 wt. %) blend of the present invention utilizing a PSt with a molecular weight of 45,000 g/mol.
Figure 9C:
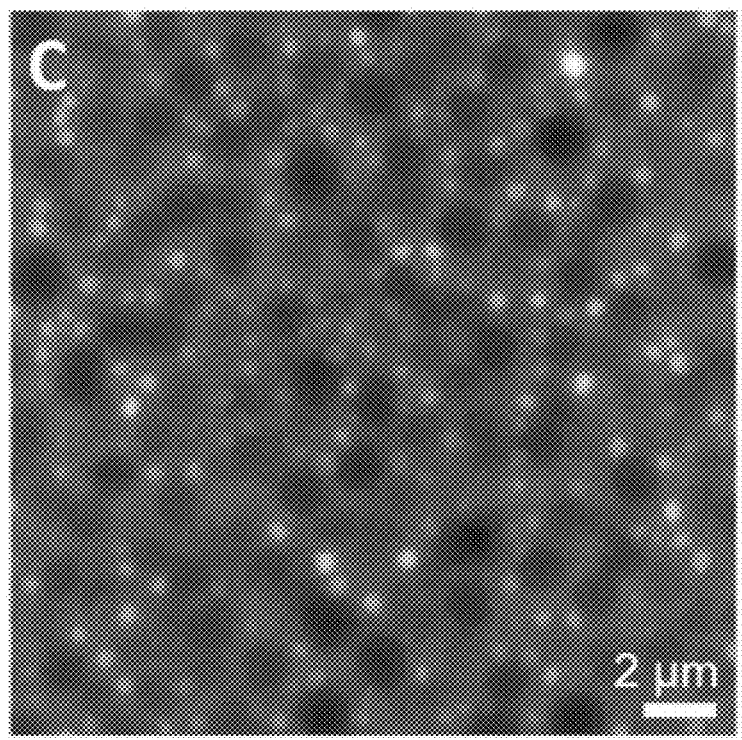
FIG. 9C is an AFM height image of a SIBS/PSt (57/43 wt. %) blend of the present invention utilizing a PSt with a molecular weight of 45,000 g/mol.

SIBS/PSt blends of the present invention utilizing PSt having a molecular weight of 45,000 g/mol, showed a uniform morphology, as shown in FIGS. 9A, 9B, and 9C. The PSt domains remained small (<500 nm) and were uniformly distributed in the SIBS matrix.

The molecular weight of PSt also affected the printability of the SIBS/PSt blends of the present invention. Blends utilizing PSt with a higher molecular weight exhibited better printability than blends utilizing PSt with a lower molecular weight at the same weight fraction. Specifically, SIBS/PSt blends utilizing a PSt with a molecular weight of 192,000 g/mol had the best printability, followed by SIBS/PSt blends utilizing a PSt with a molecular weight of 45,000 g/mol, and SIBS/PSt blends utilizing a PSt with a molecular weight of 1,200 were the worst among the three.

Figure 10A:
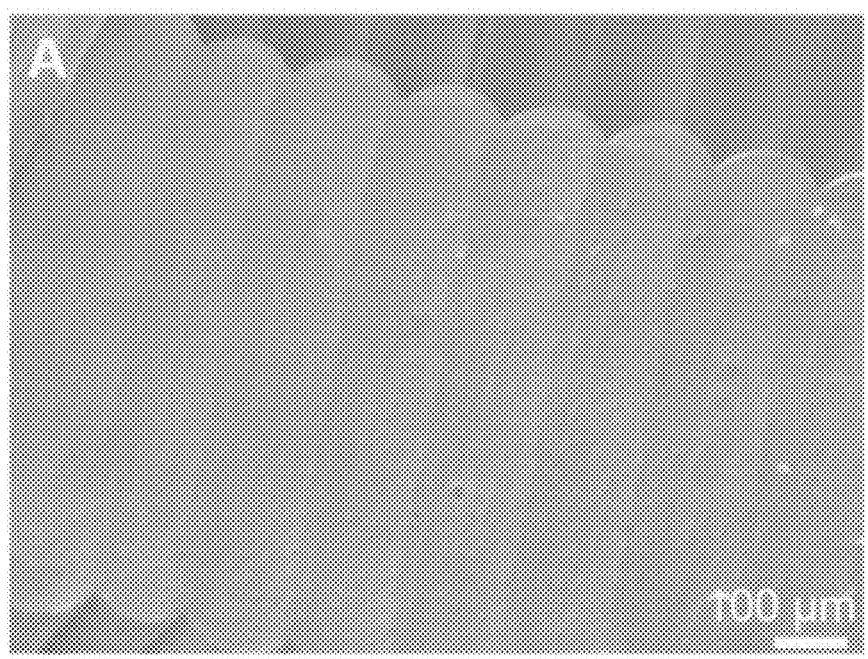
FIG. 10A is a scanning electron microscopy (SEM) image of a cross section of a 3D-printed item utilizing a SIBS/PSt (77/23 wt. %) blend of the present invention utilizing a PSt with a molecular weight of 192,000 g/mol.
Figure 10B:
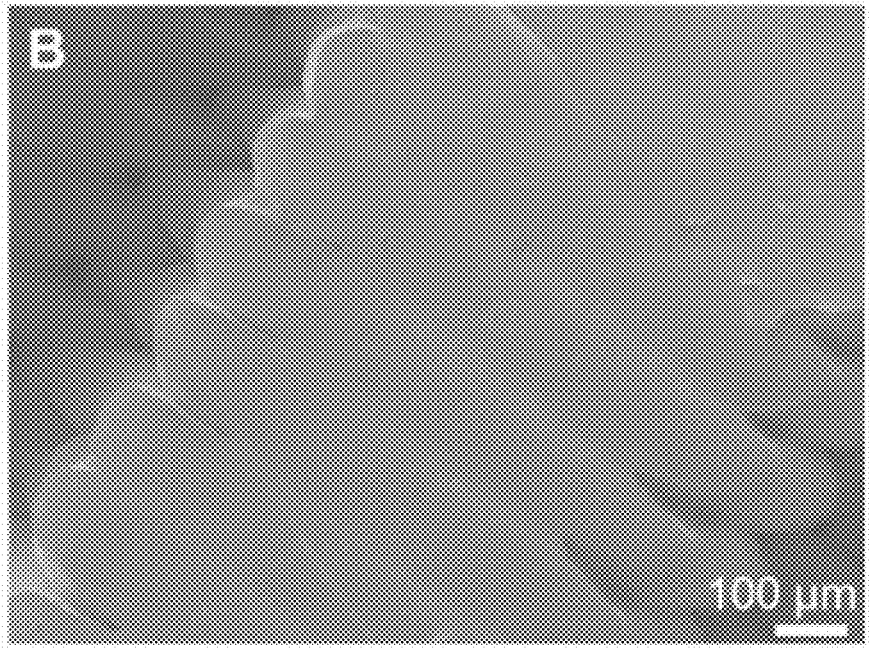
FIG. 10B is an SEM image of a cross section of a 3D-printed item utilizing a SIBS/PSt (77/23 wt. %) blend of the present invention utilizing a PSt with a molecular weight of 45,000 g/mol.
Figure 10C:
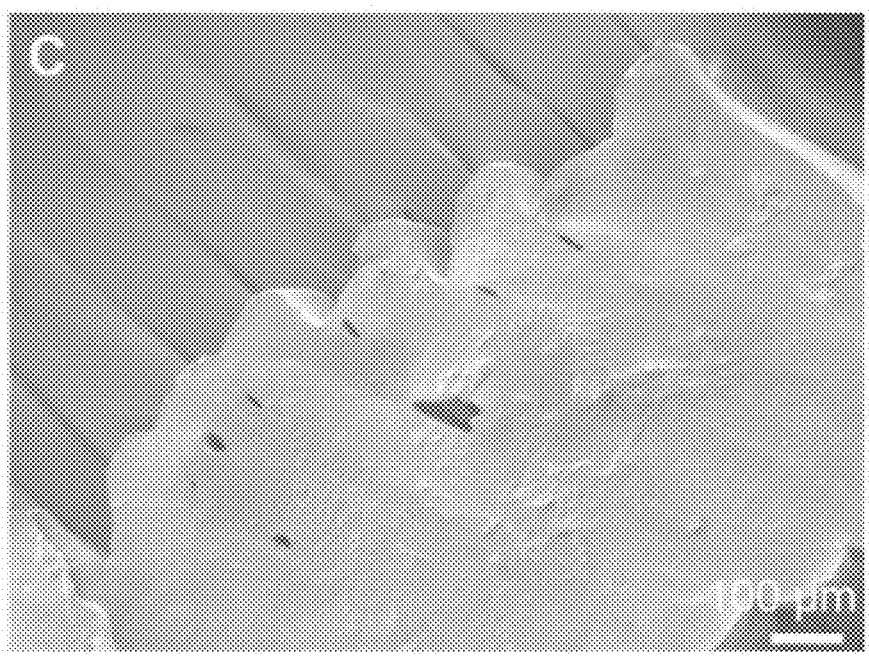
FIG. 10C is an SEM image of a cross section of a 3D-printed item utilizing a SIBS/PSt (77/23 wt. %) blend of the present invention utilizing a PSt with a molecular weight of 1,200 g/mol.

Differences in printability were confirmed by morphological examination of the internal structure of the 3D printed objects. Scanning Electron Microscopy (SEM) images of cross-sections of 3D printed SIBS/PSt, with PSt molecular weights of 192,000, 45,000, and 1,200 g/mole, at 23 wt. % are shown in FIGS. 10A, 10B, and 10C, respectively. SIBS/PSt(192k) exhibited the most uniform and smooth morphology; SIBS/PSt(45k) showed imperfections, such as gaps between the printing layers at the boundary; and SIBS/PSt(1.2k) showed distorted morphology with small holes inside.

Experiment II—SIBS/PPO

Blending of Polymers and Fabrication of Filaments

SIBS was provided by Kaneka Co. (molecular weight=75,500 g/mol, 30 wt. % PSt blocks) and the PPO was obtained from Scientific Polymer Products, Inc. (molecular weight=50,000 and 19,000 g/mol). Blending was conducted by dissolving both SIBS and PPO in toluene/chloroform (50/50 v/v), and the weight ratio of SIBS/PPO in the blends varied from 70/30 to 30/70. The solvents were then evaporated, and the solid SIBS/PPO blends were dried and cut into small pieces for filament fabrication. The filaments were prepared using a Wellzoom B2 Desktop Filament Extruder operated at an extrusion temperature of 180° C. with an extrusion nozzle 1.75 mm in diameter.

Morphological Studies

Figure 11A:
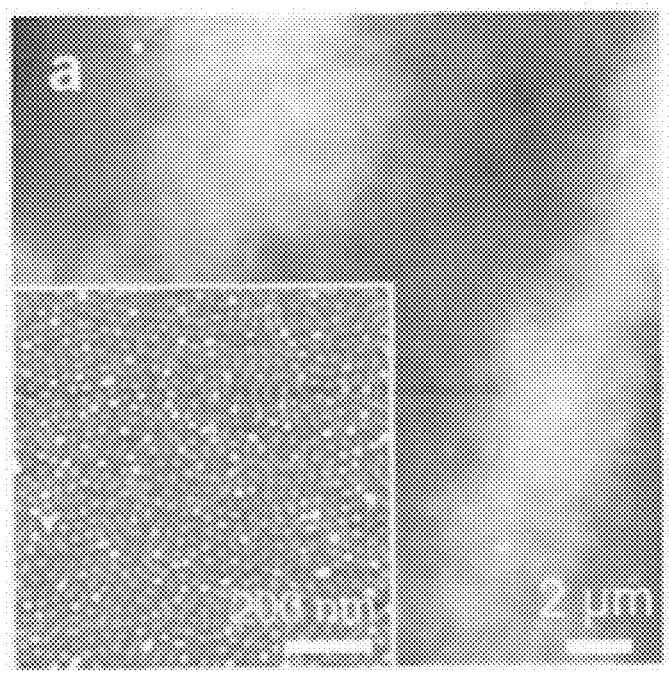
FIG. 11A is an AFM height image of pure SIBS and an insert image of a higher resolution AFM height image of pure SIBS.
Figure 11B:
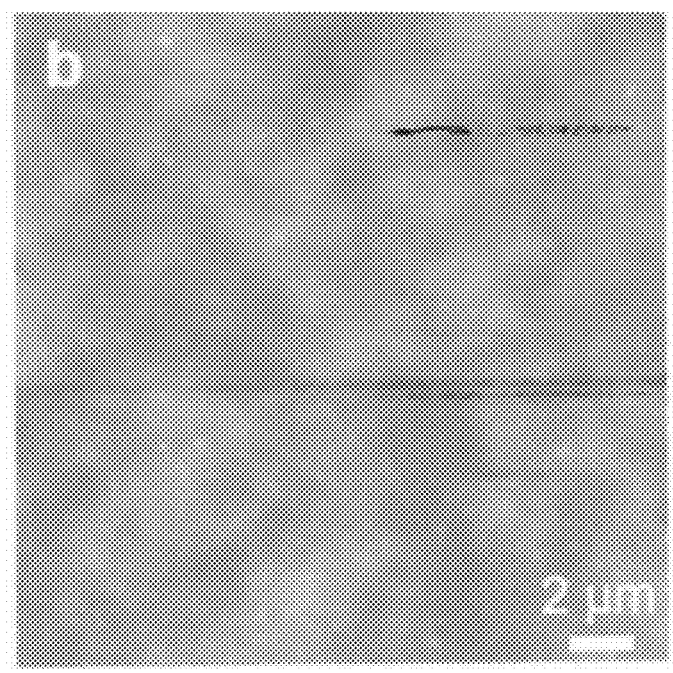
FIG. 11B is an AFM height image of pure PPO.
Figure 11C:
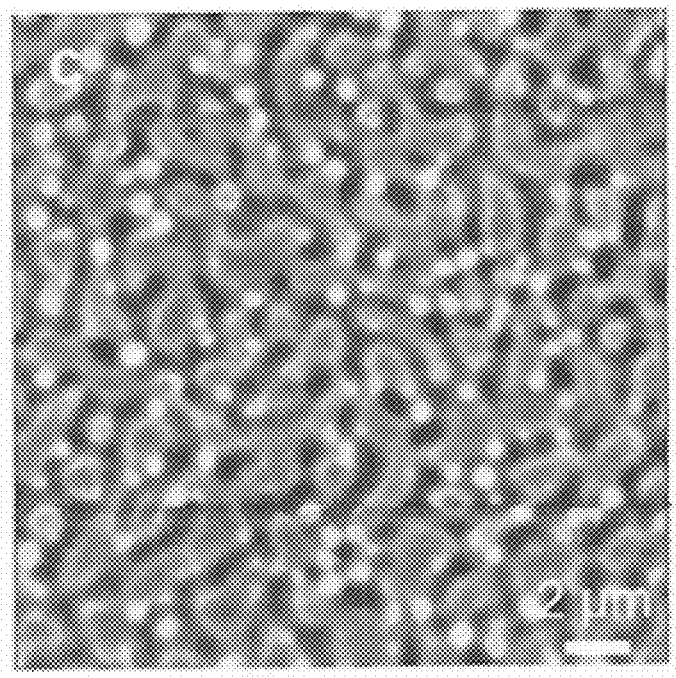
FIG. 11C is an AFM height image of a SIBS/PPO (70/30 wt. %) blend of the present invention.
Figure 11D:
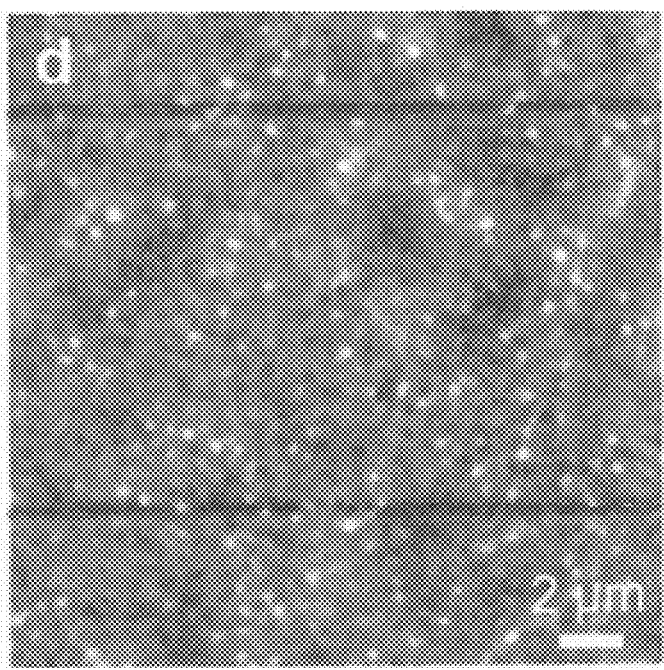
FIG. 11D is an AFM height image of a SIBS/PPO (60/40 wt. %) blend of the present invention.
Figure 11E:
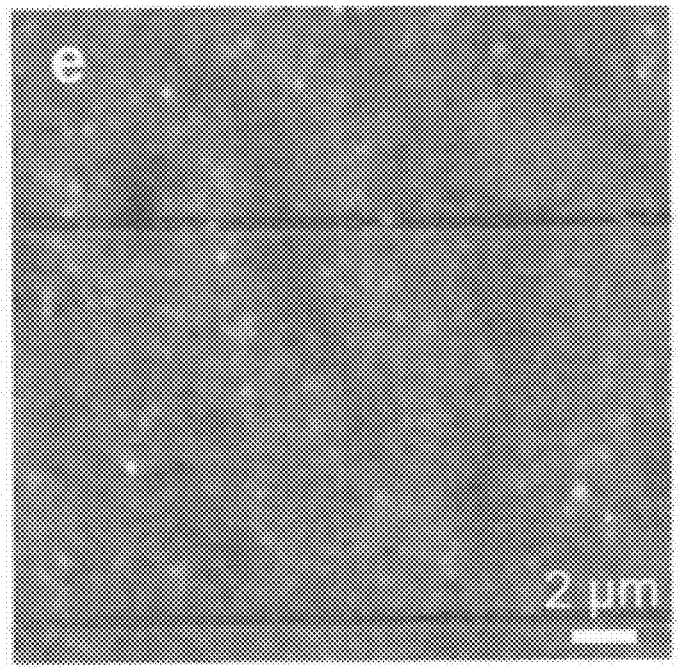
FIG. 11E is an AFM height image of a SIBS/PPO (50/50 wt. %) blend of the present invention.
Figure 11F:
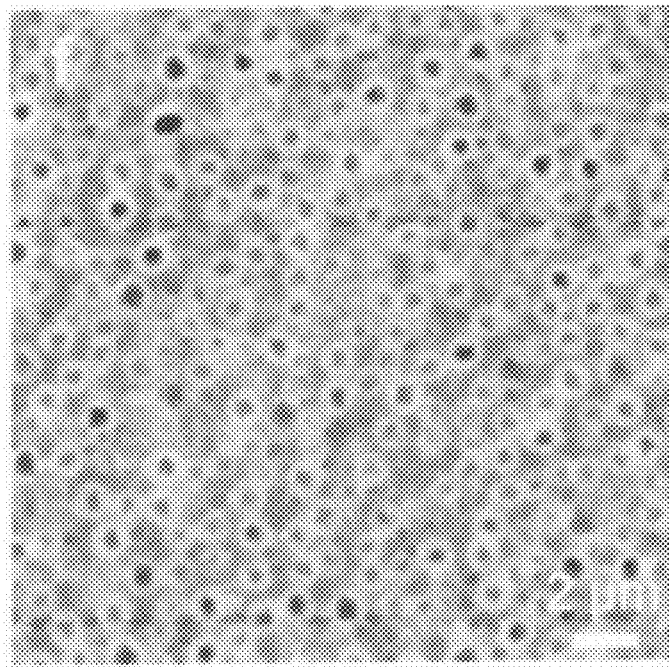
FIG. 11F is an AFM height image of a SIBS/PPO (30/70 wt. %) blend of the present invention.

The morphology of the SIBS/PPO blends of the present invention were studied by AFM (Bruker Icon). SIBS exhibits an overall uniform morphology with a typical hexagonal packed cylindrical microphase-separated structure between the PSt and the PIB blocks at the nanometer scale as shown in FIG. 11A. PPO exhibits a smooth surface without observable features as shown in FIG. 11B. The addition of PPO to SIBS produced substantial morphological changes. Large-area scans of the 70/30 SIBS/PPO blend showed high surface roughness with large height variation, as shown in FIG. 11C, with several small spherical PPO-rich domains (about 500 nm) of higher heights. In contract, the 60/40 SIBS/PPO blend and the 50/50 SIBS/PPO blends, as shown in FIGS. 11D and 11E, showed relatively smooth surfaces. With increasing PPO content, as in the 30/70 SIBS/PPO blend shown in FIG. 11F, rough surfaces were seen with high-density spherical core-shell domains (about 700 nm) in a continuous matrix.

The high-resolution AFM images of FIG. 11 show that SIBS/PPO blends with PPO content between 30% and 50% exhibited a two-phase co-continuous structure parallel to the substrate, which is in contrast to the vertical cylindrical structure of SIBS on its own. When PPO becomes the major component, the blend no longer shows a well-defined microphase separated morphology, but instead exhibits small spherical domains with phase-separated morphology within a homogenous PPO matrix.

Hardness Testing

The hardness of a polymer is one of the defining criteria for the applicability for said polymer in 3D printing. The hardness of SIBS on its own and the SIBS/PPO blends of the present invention were determined with a Shore A Digital hardness tester (Gain Express Holdings, Ltd.) according to ISO 868-1986. SIBS on its own had a hardness of 43.7 (Shore A), which is too soft to be used in 3D printing, which requires a Shore A hardness of at least 55 and more preferably, 60 or higher. The 70/30 SIBS/PPO blend of the present invention had a Shore A hardness of 68, wherein the 60/40 SIBS/PPO blend of the present invention had a Shore A hardness of 78, and the 50/50 SIBS/PPO blend of the present invention had a Shore A hardness of 85.

Rheological Characterization

Figure 12:
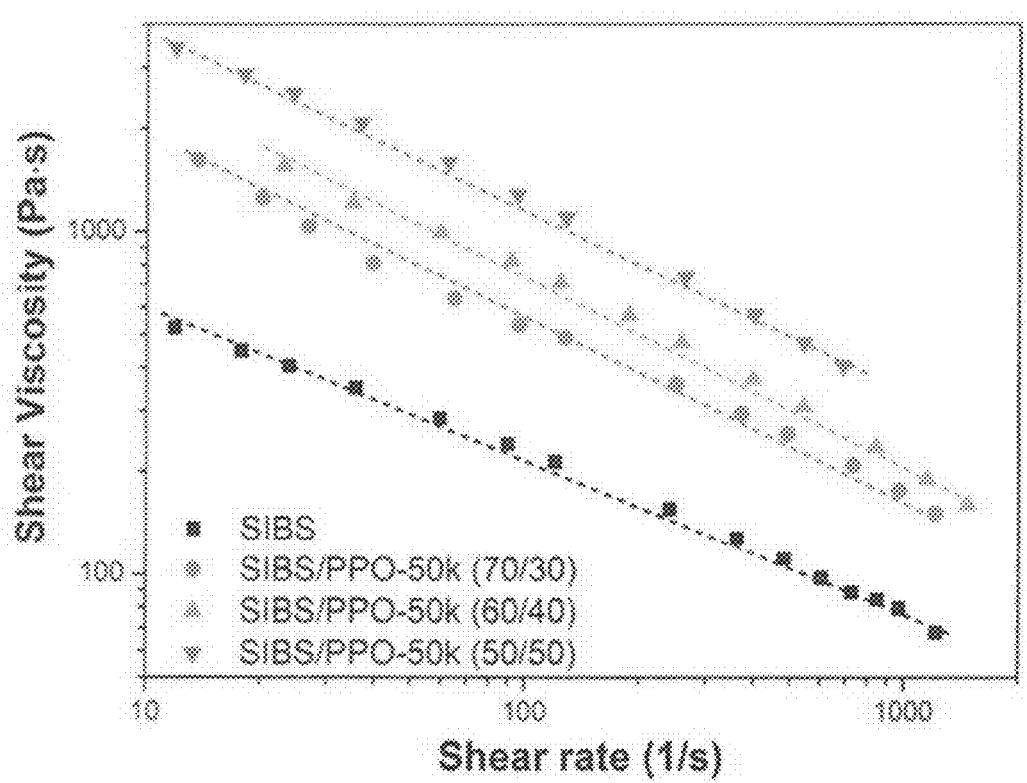
FIG. 12 is a graph of the shear viscosity as a function of shear rate for pure SIBS and SIBS/PPO blends of the present invention.

The melt viscosity or flowability of a polymer is another important aspect of a polymer being useful in 3D printing. Melt viscosity is usually expressed by the melt flow index or shear viscosity. A low shear viscosity is beneficial for 3D printing because this means that the melt can be extruded more easily. The rheological properties of SIBS on its own and the SIBS/PPO blends of the present invention were studied using a capillary rheometer (Rosand RH 7). The shear viscosity of SIBS on its own and the SIBS/PPO blends of the present invention were determined as a function of shear rate, as shown in FIG. 12. SIBS on its own and the SIBS/PPO blends of the present invention all showed shear thinning.

The shear viscosity of SIBS on its own and the SIBS/PPO blends of the present invention were measured and compared at a shear rate of 20 $s^{-1}$ (a rate close to the shear rate of the nozzle in an extruder during FFF 3D printing). SIBS on its own had a shear viscosity of 435 Pa·S; the 70/30 SIBS/PPO blend of the present invention had a shear viscosity of 1326 Pa·S; the 60/40 SIBS/PPO blend of the present invention had a shear viscosity of 1804 Pa·S; and the 50/50 SIBS/PPO blend of the present invention had a shear viscosity of 2652 Pa·S. It was also determined that SIBS/PPO blends with 60 wt. % or above of PPO had too high a shear viscosity to be 3D printed. Therefore, the shear viscosity of SIBS/PPO blends of the present invention, at a 20 $s^{-1}$ shear rate, needs to be below 3000 Pa·S to be viable for 3D printing.

Thermal Stability

Figure 13:
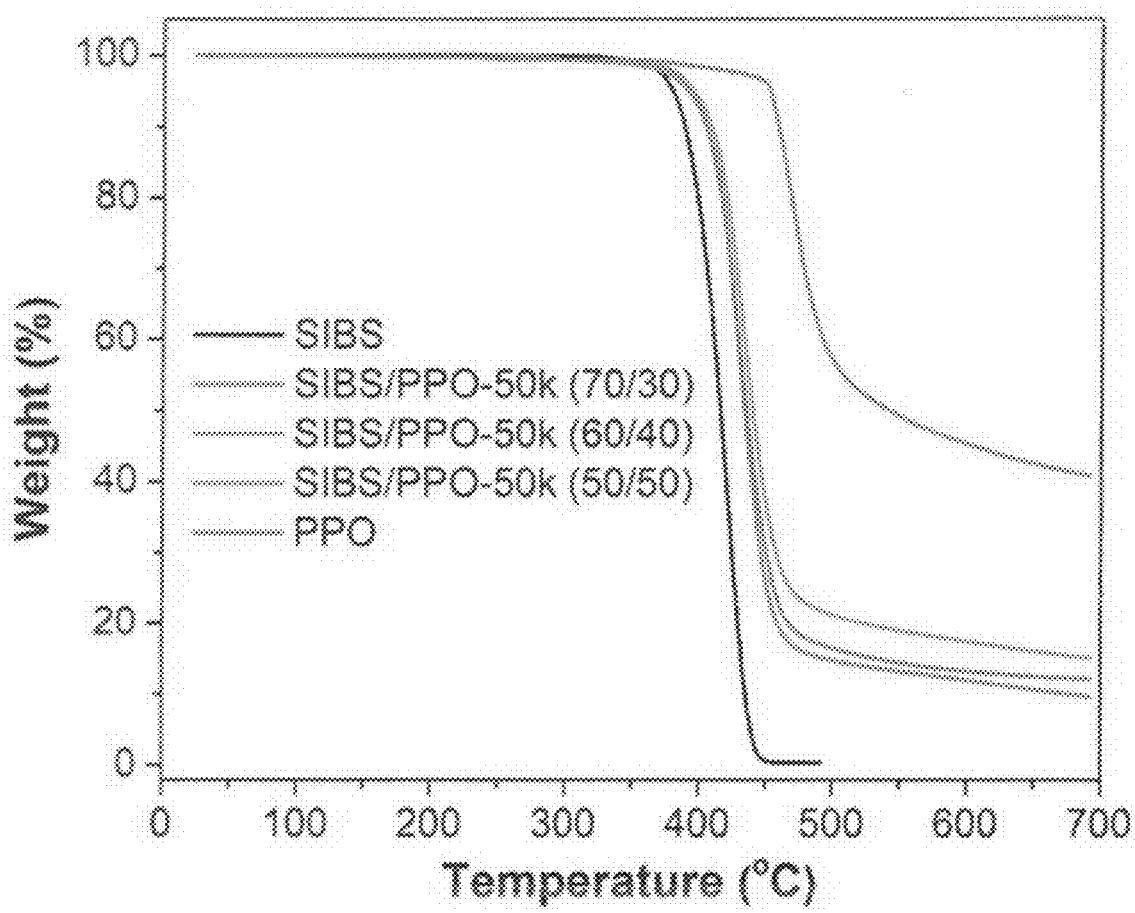
FIG. 13 is a graph of TGA traces of pure SIBS and SIBS/PPO blends of the present invention.

The thermal stability of SIBS on its own and the SIBS/PPO blends of the present invention were studied by thermogravimetric analysis (TGA) (TA Instruments Q500). PPO on its own has excellent thermal stability with a maximum weight loss rate temperature ($T_{max}$) of 470° C. Compared with SIBS on its own, SIBS/PPO blends of the present invention have enhanced thermal stability as shown in FIG. 13. The maximum weight loss rate temperature increased from 422° C. for SIBS on its own, to 440° C. for blends of SIBS/PPO (with PPO having a molecular weight of 50,000 g/mol). The remaining weight at 500° C. is close to zero for SIBS on its own and increases to 14.7% for 70/30 SIBS/PPO blends, to 16.4% for 60/40 SIBS/PPO blends, and to 21.2% for 50/50 SIBS/PPO blends.

Dynamic Mechanical Analysis

Dynamic mechanical analysis (DMA) was used to characterize the viscoelastic behavior of SIBS on its own and the SIBS/PPO blends of the present invention. SIBS on its own showed two main transitions, a high temperature transition, corresponding to the glass transition ($T_g$) of the PSt block at about 105° C., and a low temperature transition, which consisted of a shoulder at about 40° C. associated with the PIB block, and a prominent peak at about −15° C., likely due to a sub-Rouse type motion caused by relaxation at longer time scales.

Figure 14:
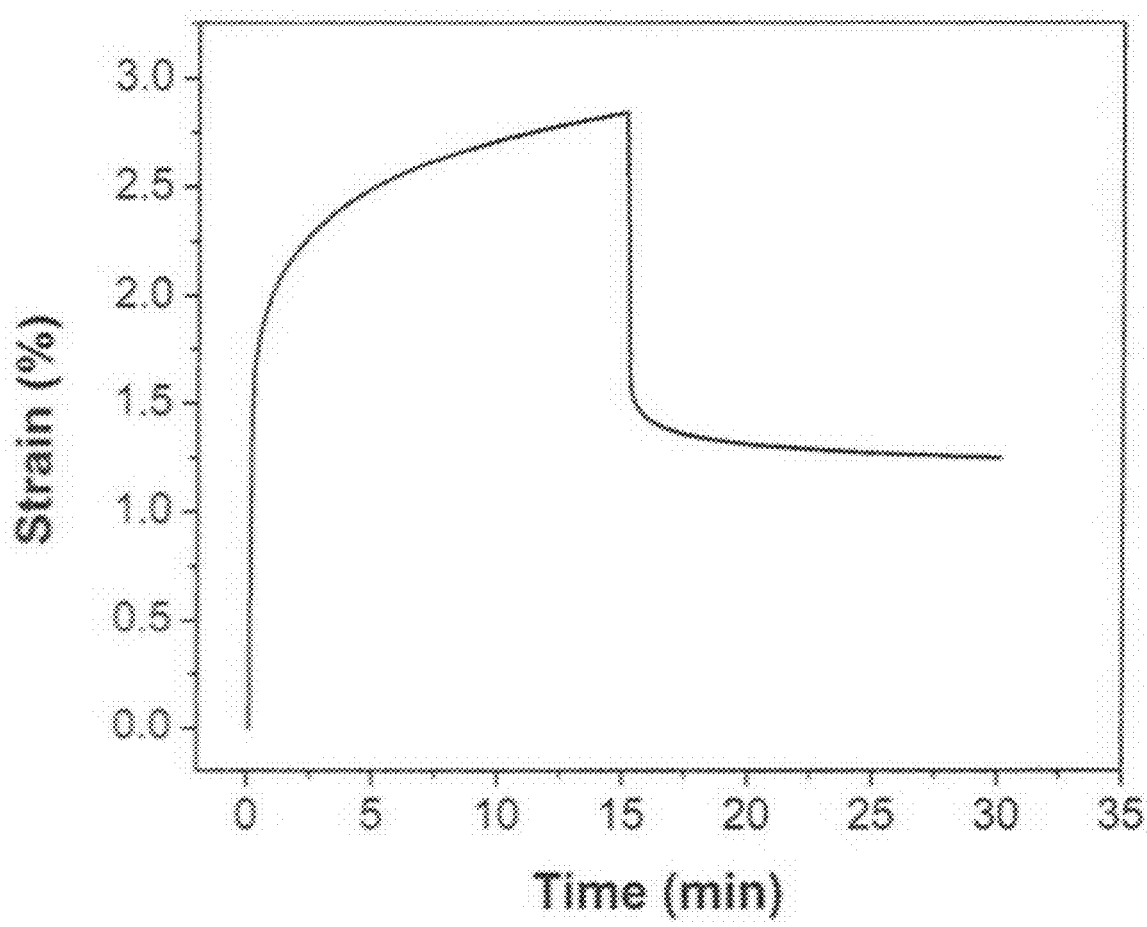
FIG. 14 is a graph of creep of a SIBS/PPO (60/40 wt. %) blend of the present invention utilizing a PPO with a molecular weight of 50,000 g/mol.

Compared with SIBS on its own, the 60/40 SIBS/PPO (with PPO having a molecular weight of 50,000 g/mol) blend of the present invention has a higher storage modulus and loss modulus above −20° C. It also has a more pronounced peak associated with the PIB block at −40° C. The improved mechanical properties of the SIBS/PPO blends of the present invention are important for successful FFF 3D printing. The creep of the 60/40 SIBS/PPO (with PPO having a molecular weight of 50,000 g/mol) blend of the present invention were determined as shown in FIG. 14. At 1 MPa tensile stress over 15 minutes, the sample showed a linear regime, followed by a creep stage. The strain reached 2.8% after 15 minutes, and after the stress was released, the deformation rapidly recovered to 1.3%. In contrast, SIBS on its own exhibited rapid and severe creep deformation under the same conditions, beyond the instrument measurable range. Based on the results, blending SIBS with PPO enhances the creep resistance the blend.

3D Printing

Filaments of SIBS/PPO blends of the present invention were used for FFF 3D printing using a commercial 3D printer (Wanhao Duplicator i3) equipped with a modified printing head (Flexion Extruder) with a 0.8 mm nozzle diameter. The printing was conducted at 250° C., with a build-plate temperature of 80° C., and a printing speed which was varied from 0.2 to 20 mm/s. The printing head moved in the X, Y, and Z directions. The 3D models were built using Solidworks software.

Table 2 above summarizes the printability of SIBS on its own and SIBS/PPO blends of the present invention. Printability is defined in this experiment of the present invention by the successful printing of a 3D object of at least 5 mm height and/or 40 printing layers without extrusion failure or large defects. SIBS on its own cannot be printed due to its softness. "Acceptable" printability indicates that the object was successfully printed, but the surface was rough with occasional defects. "Good" printability indicates that the object was successfully printed with high shape fidelity and the absence of defects. As stated above, blends with 60 wt. % of more PPO could not be printed due to high shear viscosity.

Figure 15A:
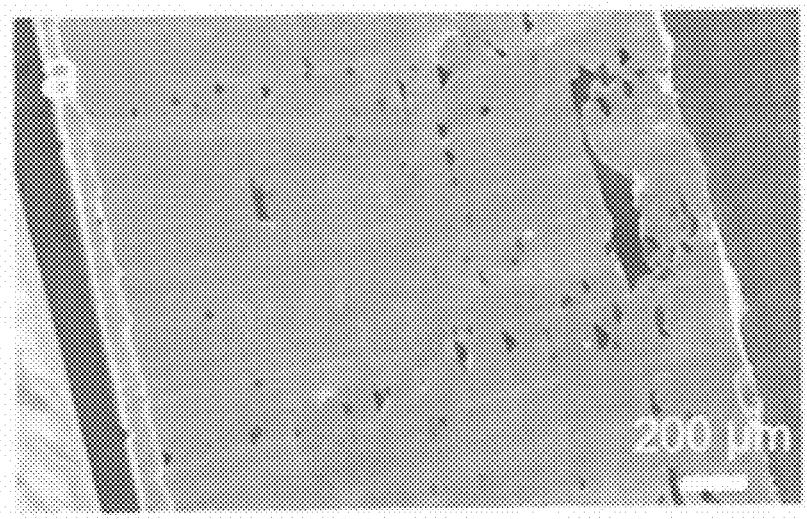
FIG. 15A is an SEM image of a cross-section of a 3D-printed structure utilizing a SIBS/PPO (70/30 wt. %) blend of the present invention utilizing PPO with a molecular weight of 50,000 g/mol.
Figure 15B:
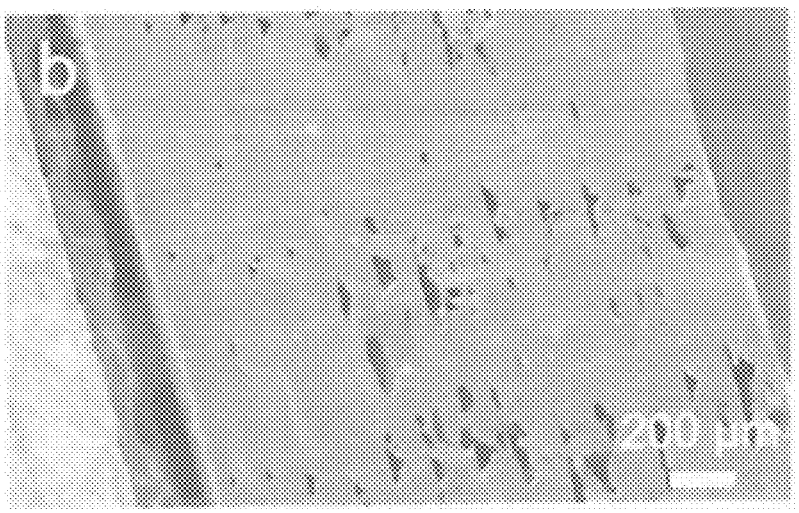
FIG. 15B is an SEM image of a cross-section of a 3D-printed structure utilizing a SIBS/PPO (60/40 wt. %) blend of the present invention utilizing PPO with a molecular weight of 50,000 g/mol.
Figure 15C:
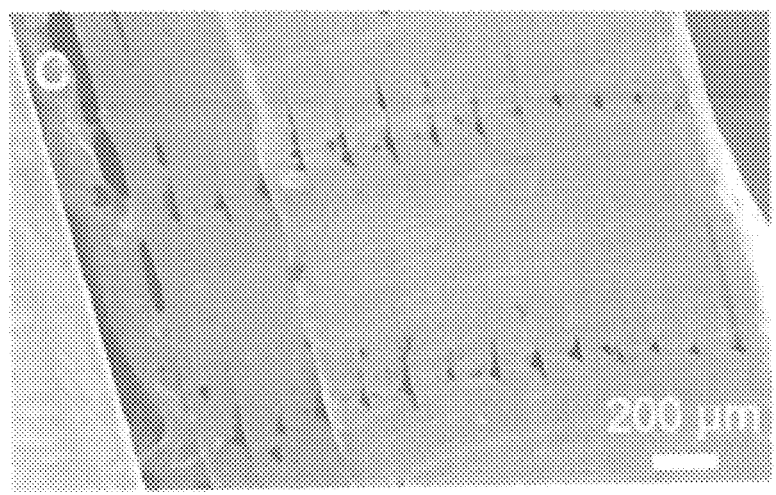
FIG. 15C is an SEM image of a cross-section of a 3D-printed structure utilizing a SIBS/PPO (50/50 wt. %) blend of the present invention utilizing PPO with a molecular weight of 50,000 g/mol.

A printable SIBS/PPO blend of the present invention exhibited greater than 60 hardness (Shore A) and less than 3000 Pa·s shear viscosity (at 20 $s^{-1}$ shear rate). The internal structure (cross-sections) of 3D printed objects utilizing blends of the present invention were studied by SEM as shown at FIGS. 15A, 15B, and 15C. There were small discontinuities at layer interfaces (printing path boundaries) and as these discontinuities were small, they should not affect the physical properties of the objects. The interlayer fusion of the 70/30 SIBS/PPO blend of the present invention and that of the 60/40 SIBS/PPO blend of the present invention were superior to that of the 50/50 SIBS/PPO blend of the present invention.

Tensile Testing

Figure 16:
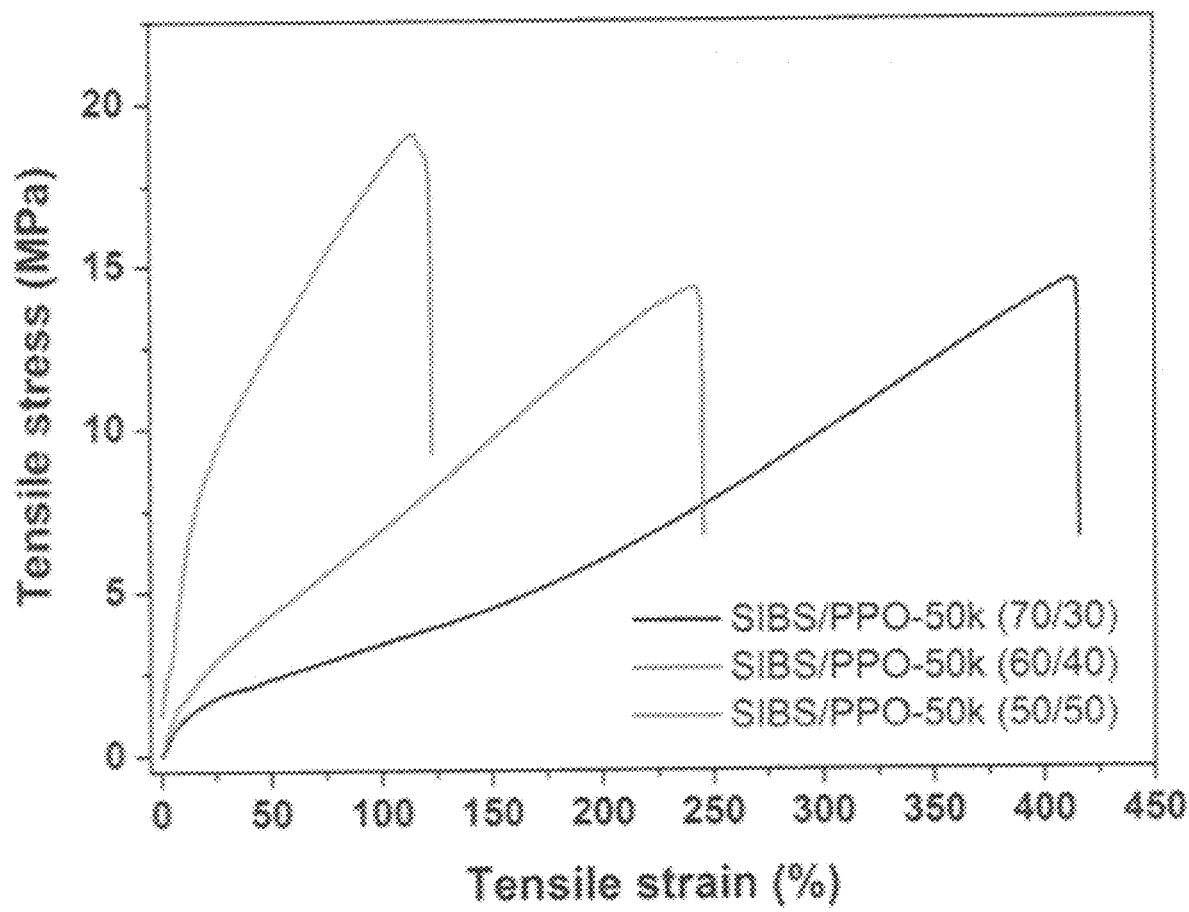
FIG. 16 is a graph of stress-strain traces of 3D-printed structures utilizing SIBS/PPO blends of the present invention wherein each blend is using a PPO with a molecular weight of 50,000 g/mol.

SIBS/PPO blends of the present invention were formed into filaments and then 3d printed into dog-bone shapes for tensile testing by the ISO-37 (type 3) standard. Tests were conducted using an Instron 4204 Tensile Tester and the representative stress-strain curves are shown in the graph of FIG. 16. SIBS on its own showed at tensile strength of 13.0 MPa, a 3.4 MPa modulus, and a 707% elongation at break. The SIBS/PPO blends of the present invention exhibited higher tensile strength and modulus and a lower elongation at break than that of SIBS on its own. With Table 3 below summarizing the mechanical properties found during the tensile testing.

TABLE 3

Mechanical Properties by Tensile Testing of 3D printed SIBS/PPO blends

| Sample | PPO Molecular Weight (g/mol) | Tensile Strength (MPa) | Elongation at Break (%) | Modulus (MPa) |
|---|---|---|---|---|
| SIBS/PPO (70/30) | 50,000 | 14.6 | 431 | 12.3 |
| SIBS/PPO (60/40) | 50,000 | 14.3 | 240 | 21.9 |
| SIBS/PPO (50/50) | 50,000 | 17.5 | 100 | 77.0 |
| SIBS/PPO (70/30) | 19,000 | 13.9 | 338 | 15.0 |
| SIBS/PPO (60/40) | 19,000 | 15.4 | 186 | 33.0 |

The Effect of the Molecular Weight of the PPO

The molecular weight of the PPO in the SIBS/PPO blends of the present invention affect the morphology and physical properties of said blends. Low molecular weight PPO is expected to be completely miscible with SIBS, and to evaluate this, PPO with a molecular weight of 19,000 g/mol were mixed with SIBS at different ratios and the morphology and properties were studied.

The morphological changes of the blends of SIBS/PPO using a PPO with a molecular weight of 19,000 g/mol (SIBS/PPO-19k) with increasing PPO content were consistent with the blends of SIBS/PPO using a PPO with a molecular weight of 50,000 g/mol (SIBS/PPO-50k). For instance, blends of 70/30 SIBS/PPO-19k showed a high density of spherical PPO-rich domains of about 500 nm within a microphase-separated matrix. Blends of 60/40 SIBS/PPO-19k and blends of 50/50 SIBS/PPO-19k were more homogeneous and their surfaces were smooth. By further increasing the PPO content, blends of 30/70 SIBS/PPO-19k showed spherical core-shell domains within the PPO matrix. High-resolution AFM images of SIBS/PPO-19k blends with 20-50 wt. % PPO showed two-phase co-continuous microphase-separated morphologies. However, 70/30 SIBS/PPO-19k blends exhibited small phase-separated domains scattered within the homopolymer matrix.

The molecular weight of the PPO also affects the 3D printability of the SIBS/PPO blends of the present invention. The SIBS/PPO blends of the present invention are printable with 30% to 50% of the PPO-50k, while the SIBS/PPO blends of the present invention are printable with 30% to 40% of the PPO-19k.

Figure 17:
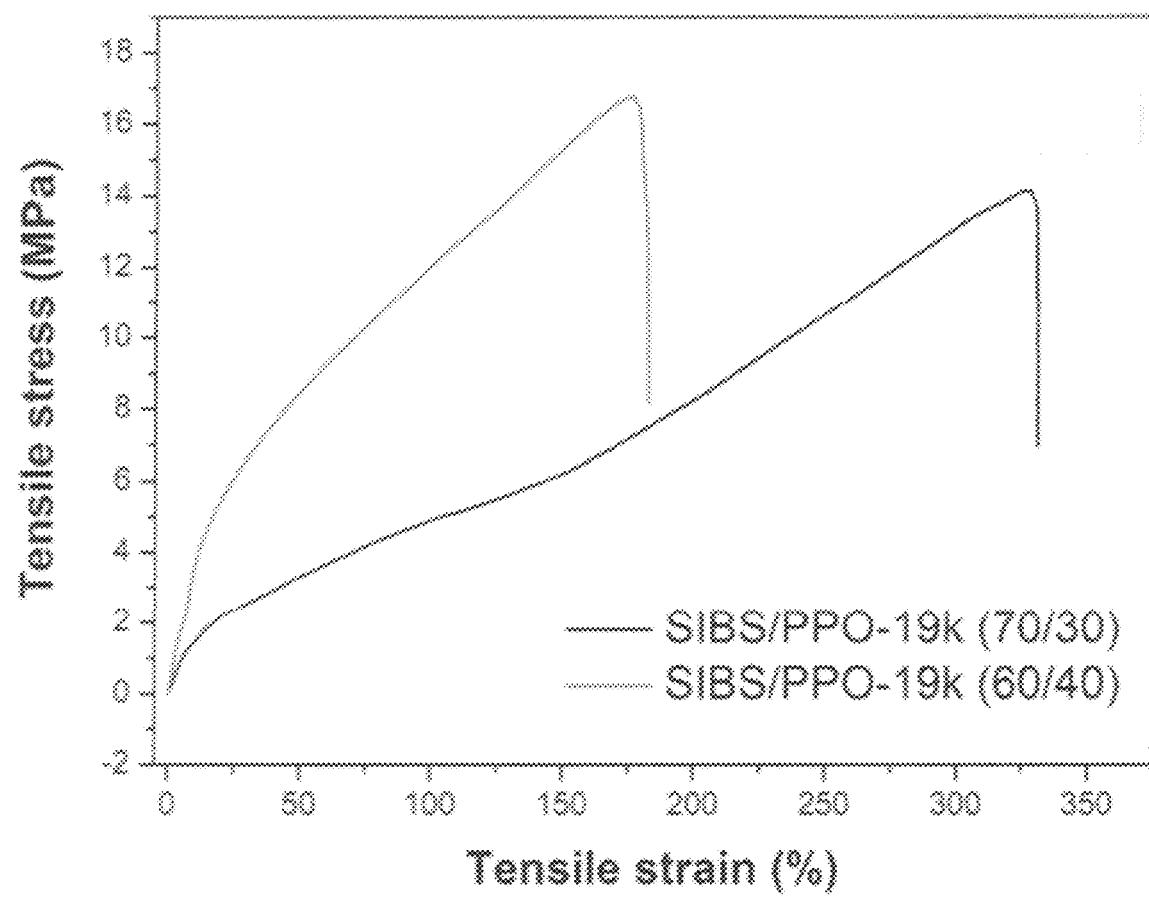
FIG. 17 is a graph of stress-strain traces of 3D-printed structures utilizing SIBS/PPO blends of the present invention wherein each blend is using a PPO with a molecular weight of 19,000 g/mol.

The molecular weight of the PPO also affects the mechanical properties of the SIBS/PPO blends of the present invention. The graph of FIG. 17 shows representative stress-strain traces for 70/30 SIBS/PPO-19k blends and 60/40 SIBS/PPO-19k blends. The 70/30 SIBS/PPO-19k blends showed a higher modulus of 15 MPa and a lower elongation at break of 338% than compared to 70/30 SIBS/PPO-50k blends. Similarly, 60/40 SIBS/PPO-19k blends showed a higher modulus of 33 MPa and a lower elongation at break of 186% than compared to 60/40 SIBS/PPO-50k blends.

Experiment III—SIBS/Noryl® Blends

Noryl® is an engineered plastic of a blend of PSt and PPO with an outstanding combination of mechanical and thermal properties. As SIBS contains PSt blocks, the two materials were compatible. SIBS/Noryl® blends of the present invention containing 40 wt. % Noryl® were able to be extruded into thin filaments of 1.75 mm in diameter and said filaments were useful in 3D printing.

In light of the foregoing, it should be appreciated that the present invention significantly advances the art by providing a 3D printable thermoplastic blend that is structurally and functionally improved in a number of ways. For instance, it should now be evident how blends of thermoplastic elastomers and polymers can be used for the 3D printing of articles. Heretofore, thermoplastic elastomers were not readily 3D printable because of frequent extrusion failures (e.g., improper filament diameter, filament buckling, and annular backflow), poor interlayer adhesion, and insufficient object/bed adhesion. By blending polymers such as PSt and PPO with TPEs, improved TPE blends can be achieved that are 3D printable in the FDM and FFF 3D printing of soft 3D structures. It has been found that by the blends of the present invention can exhibit greater than 60 hardness (Shore A) and less than 3000 Pa-s shear viscosity (at 20 s-1 shear rate).

Although the present invention has been described in considerable detail with reference to certain embodiments, other embodiments are possible. Therefore, the spirit and scope of the appended claims should not be limited to the description of the embodiments contained herein. The scope of the invention shall be appreciated from the claims that follow.

What is claimed is:

1. A 3D-printable blend comprising a thermoplastic elastomer and a polymer; wherein the thermoplastic elastomer is selected from the group consisting of poly (styrene-b-isobutylene-b-styrene) (SIBS and its hydrogenated derivative, and wherein the polymer is selected from the group consisting of polystyrene (PSt), poly (2,6-dimethyl-1,4-phenylene oxide) (PPO) and blends of PSt and PPO.

2. The 3D-printable blend of claim 1, wherein Shore A hardness, shear viscosity, thermal stability, storage modulus, and loss modulus of the blend are all increased as compared to a composition that contains SIBS or its hydrogenated derivative.

3. The 3D-printable blend of claim 1, wherein the polymer is PSt and wherein the 3D-printable blend contains between 20 and 50 wt. % of PSt.

4. The 3D-printable blend of claim 1, wherein the polymer is PPO and wherein the 3D-printable blend contains between 30 and 60 wt. % of PPO.

5. The 3D-printable blend of claim 1, wherein the blend is extruded into filaments.

6. A 3D-printable filament of the blend of claim 1.

7. A 3D-printed article made from a blend comprising a thermoplastic elastomer and a polymer; wherein the thermoplastic elastomer is selected from the group consisting of poly (styrene-b-isobutylene-b-styrene) (SIBS) and its hydrogenated derivative, and wherein the polymer is selected from the group consisting of polystyrene (PSt), poly (2,6-dimethyl-1,4-phenylene oxide) (PPO) and blends thereof.

8. The 3D-printed article of claim 7 produced by fused deposition modeling three-dimensional printing or by fused filament fabrication three-dimensional printing.

* * * * *